United States Patent [19]
McReynolds et al.

[11] 4,167,784
[45] Sep. 11, 1979

[54] AVERAGE-MODE TRAFFIC CONTROL SYSTEM

[75] Inventors: Marshall B. McReynolds; Jack D. Van Tilbury, both of Arlington, Va.

[73] Assignee: Trac Incorporated, Alexandria, Va.

[21] Appl. No.: 843,730

[22] Filed: Oct. 19, 1977

[51] Int. Cl.[2] ........................ G06F 15/48; G08G 1/08
[52] U.S. Cl. ........................ 364/436; 340/40; 340/41 R; 364/107
[58] Field of Search .................. 364/436, 437; 340/35, 340/36, 37, 40, 41

[56] References Cited

U.S. PATENT DOCUMENTS 3,241,107 3/1966 DuVivier .................... 364/436

OTHER PUBLICATIONS

Crouse-Hinds: Technical Data Bulletin-Two Phase DM-200 Series Digital Controller Units, Nov. 1976.

*Primary Examiner*—Felix D. Gruber
*Attorney, Agent, or Firm*—Schwartz, Jeffery, Schwaab, Mack, Blumenthal & Koch

[57] ABSTRACT

Apparatus and method for controlling a plurality of traffic signal lights at a plurality of intersections along a roadway for operation in an average mode for substantially equally favoring traffic flow in each of two directions.

12 Claims, 22 Drawing Figures

DATA BUS
ADDRESS BUS
C.P.U.
(8080A)
CLOCK GEN. D8224
4013
14585
Q1
2N3563
RESIN
9Mhz
47pf
100K
.001
4.7K
1K
3K
.0015
6.8
0.1
RD.
DBIN
WAIT READY
A=B

AVERAGE-MODE TRAFFIC CONTROL SYSTEM

INDEX

BACKGROUND OF THE INVENTION
- Field of the Invention
- Description of the Prior Art SUMMARY OF THE INVENTION
BRIEF DESCRIPTION OF THE DRAWINGS
DETAILED DESCRIPTION OF THE PREFERRED EMBODIMENT
SYSTEM OVERVIEW
MODULE DESCRIPTION AND DEFINITIONS
- Master Unit 50
- Directional Module
- System Module
- Inbound and Outbound Modules
- Volume Module
- Occupancy and Speed Modules
- Average Module
- Display Module
- Secondary Unit 40
- Split 1 and Split 2 Modules
- Offset Module
- Display Module
- Selector Position
- Interface Module - Master and Secondary SYSTEM HARDWARE DESCRIPTION
FUNCTIONAL DESCRIPTION OF THE MASTER UNIT
- Overall Description
- Real Time Traffic Sampling
- Master Cycle Length Computation
- Volume Computations
- Occupancy Computation
- Average Cycle Length Selection
- Directional Commands
- Commands Based Upon Occupancy
- Output Decisions Update Intervals
- Manual Override
- System Percent Average
- Display FUNCTIONAL DESCRIPTION OF THE SECONDARY UNITS
- Average Offsets
- Transition Response
- Force Off Operation
- Free Operation
- Flash/Pre-Emption Operation
- Timer Monitoring
- Standby Operation
- Automatic Input Test

SOFTWARE DESCRIPTION
MASTER UNIT

BACKGROUND OF THE INVENTION

1. Field of the Invention

The invention is in the field of traffic coordinators, particularly those coordinators utilized for controlling arterial systems.

2. Description of the Prior Art

Many different types of traffic control systems have been devised in the prior art to meet particular traffic needs. Typically, traffic controllers are located at an intersection and may be either pretimed or traffic actuated devices. Many attempts have been made to coordinate the operation of the various controllers. Simple systems utilize time clocks or simple program units to coordinate a plurality of timers to thereby permit progressive traffic flow patterns. More sophisticated systems utilize a separate master coordinator (traffic computer) unit which may be programmed to control arterial systems or a complete grid network. Examples of such prior art systems are shown, for example, in U.S. Pat. Nos. 3,818,429, 3,660,812, 3,506,808, 3,258,745, 3,307,146, and 3,252,133. Typically, traffic control systems provide means for determining cycle lengths, offset and split information by utilizing either traffic actuated vehicle detectors to monitor traffic flow or stored parameter programs set to correspond to historical data for the intersection or artery under consideration. U.S. Pat. No. 3,258,745, for example, illustrates a traffic control system for an artery utilizing traffic actuating controllers and permitting adaptive control of split data in response to vehicle presence. U.S. Pat. No. 3,506,808, for example, discloses the utilization of both volume and occupancy detectors to determine appropriate cycle length in an analog computing and control system. Digital processing techniques for a traffic control system are shown, for example, in U.S. Pat. No. 3,818,429. Most of these prior art systems, however, lack the flexibility necessary to control a large number of traffic conditions, are complicated to install and contain no provisions for coordinated operation during communication breakdown. Additionally, prior art coordinated traffic systems do not permit a means for achieving different cycle lengths simultaneously throughout the coordinated system to follow a platoon of vehicles through the system. As a consequence, cycle length is typically changed throughout the entire system at one time so that the coordinated system cannot truly operate to optimize the traffic flow pattern for the different platoons travelling therein.

SUMMARY OF THE INVENTION

In accordance with the invention, an arterial traffic coordinator is provided for use with a plurality of controllers and traffic detectors. Each controller is associated with a side street intersection for controlling traffic signals at the intersection. The detectors sense vehicle volume into the artery and vehicle occupancy within the artery for providing corresponding volume and occupancy signals. The coordinator comprises a means for receiving the volume and occupancy signals, a means for calculating an optimum cycle length in response to the received volume and occupancy signals and a means for storing the calculated cycle lengths corresponding to each platoon of vehicles. The coordinator further comprises means, connected to the storing means for retrieving the calculated cycle lengths, and for sequentially controlling the plurality of coordinators to effect the calculated cycle length at each associated intersection so that each platoon of vehicles moving through the intersection is controlled by its own optimum cycle length thereby achieving a coordinated traffic control.

The invention further provides for a means of changing the cycle length without the necessity of changing offset. To accomplish this end offset times are settable in seconds of travel time as opposed to percentages of cycle lengths. In this manner a constant speed through the system may be obtained while permitting variable cycle lengths.

The invention is further characterized as a distributed processing coordination system comprising a programmable master unit and a plurality of programmable secondary units. The master unit calculates system parameters such as cycle length and directional information in response to sensed volume and occupancy values. The secondary units respond to the received master information, but act in accordance with separate program instructions and in accordance with individual input parameters corresponding to the associated intersection. The independent processing capability of the secondary units prevents undesirable rapid and/or blind response to information from the master unit.

A further object of the invention is to provide a multimode coordinator operable in directional and average modes of operation. For directional inbound and outbound modes, the coordinator operates to calculate a specific cycle length to each platoon entering the artery and the calculated cycle length is rippled through the artery as the platoon of vehicles moves through the intersections. In the average mode of operation an optimum cycle length is calculated to effect substantially equally favored traffic flow in each of two directions. More generally, an average mode apparatus is provided which comprises means for establishing a directional offset time for each of the intersections which is proportional to the distance of the intersection from a reference intersection, as for example the first or last intersection in the artery. The apparatus further comprises means for dividing a reference cycle length time into each of the directional offset times for determining a remainder fraction, means for selecting an average-mode offset time for each intersection from one of the group of approximately zero percent and approximately fifty percent of the reference cycle length time in accordance with the value of the remainder fraction, and means for controlling traffic signal lights at the intersections by utilizing the selected average-mode offset times as offset values with respect to the reference intersection.

Further subject matter disclosed herein is the subject of a copending application of Marshall B. McReynolds, Jack D. VanTilbury and Irving S. Oscar, Ser. No. 843,729, filed Oct. 19, 1977, assigned to the same assignee as herein and entitled "Traffic Coordinator for Arterial Traffic System".

BRIEF DESCRIPTION OF THE DRAWINGS

These and other objects of the invention will become clear in relation to the foregoing specification taken in conjunction with the drawings wherein:

FIG. 10 is a schematic drawing of the master calling circuitry within the interface module of the master unit;

DETAILED DESCRIPTION OF THE PREFERRED EMBODIMENT

SYSTEM OVERVIEW

Figure 1:
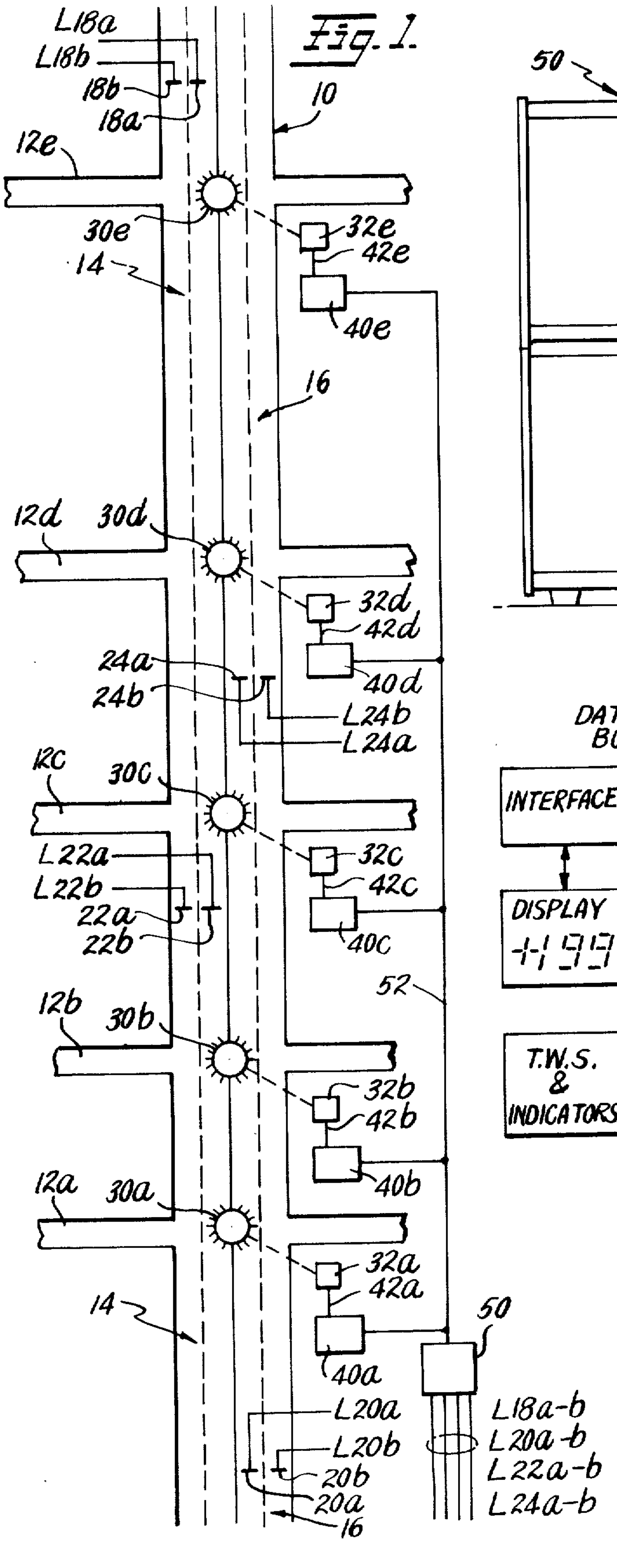
FIG. 1 is a diagrammatic illustration of a typical artery having side streets and showing the interconnection of the master and secondary units forming the coordination apparatus.

As illustrated in FIG. 1, the traffic control system of the instant invention may most advantageously be utilized to control artery traffic as shown in FIG. 1. A main artery 10 which may comprise a four lane highway, two inbound lanes and two outbound lanes, for example, is shown intersected by a plurality of side streets 12*a*–12*e*. Although only five side streets are shown it is readily understood that the number may be greater or less than five to control various lengths of artery traffic. Artery 10 comprises an inbound roadway 14 and an outbound roadway 16. At the beginning of inbound roadway 14 are positioned two inbound volume detectors 18*a* and 18*b* which may be conventional vehicle traffic detectors actuated by the vehicle. Naturally, if the inbound roadway consists of only one lane, then only a single detector 18*a* is employed. Similarly, at the beginning of the outbound road 16 two outbound volume detectors 20*a* and 20*b* are positioned to detect vehicle passage. Additional vehicle detectors are positioned between the inbound volume detectors and outbound volume detectors as for example the inbound occupancy detectors 22*a* and 22*b* and the outbound occupancy detectors 24*a* and 24*b*.

At the intersection of each sideway street 12 with the main artery 10 there is shown a traffic signal 30*a*–30*e* respectively. It is understood that the traffic signal at each intersection may comprise a plurality of lights, one governing each lane, and additional lights directing right and left turns, pedestrian crossing, leading greens and so forth as may be desired. The various traffic flow patterns governed by the signals are referred to as phases. Each traffic signal is controlled by means of associated controllers 32*a*–32*e* which may, for example, be of conventional type such as the Crouse-Hinds model DM-200. Controllers 32*a*–32*e* are effectively timers which serve to energize the various traffic signals 30*a*–30*e* and are capable of being forced off (force to red) after selectable time periods. The issuance of force-off commands to the controllers is, in fact, the mechanism by which coordination is obtained. For a detailed explanation of the operation of an exemplary controller, reference is made to the Crouse-Hinds Technical Data Bulletin, TDB-106T, November 1976, incorporated herein by reference. The coordination system described herein may coordinate any of a large number of types of controllers, and is designed in accordance with specifications of the National Electrical Manufacturers Association (NEMA) as set forth in the Standards Publication, NO. TS-1976. Secondary units 40*a*–40*e* connected respectively to controllers 30*a*–30*e* serve to override the normal controller function by issuing force-offs as dictated by coordinated master/secondary system considerations. Each secondary 40*a*–40*e* is connected by a plurality of conductors 42*a*–42*e* to each associated controller 32*a*–32*e*, respectively. Each secondary unit 40*a*–40*e* is connected to a master unit 50 by means of a communication path 52. The communication path 52 may comprise either multi-conductor cables or conventional telephone interconnections so as to permit relatively easy installation into existing traffic control equipment.

The controllers 32*a*–32*e* may be of the actuated type having associated traffic detectors for the side streets. The traffic control system in accordance with the invention effectively coordinates the operation of all of the conventional controllers 32 since the force-off information is now provided by the controllers associated secondary unit 40 as directed by the master unit 50. Additionally, each controller 32 is fed a large maximum artery green time (MAX II), and a continuous recall is made in the controller 32 to green artery phase. As a result the controllers 32 will always permit artery green unless forced-off by a secondary unit command.

The master/secondary communication scheme is a simplex-type communication. The master unit 50 operates in a broadcast mode to transmit data to all secondaries, each of which responds to the incoming data.

Lines L18*a*–L18*b* are associated with detectors 18*a* and 18*b* respectively and provide vehicle sense data to the master unit 50. Similarly, lines L20*a*–L20*b*, L22*a*–L22*b*, and L24*a*–L24*b* are connected to master unit 50 to provide corresponding vehicle detection information thereto. Although these input lines to the master unit 50 are shown connected to vehicle sensing detectors, it is clear that input signals to the master unit may originate from other sources such as weekly programmers or the like to set up desired platoons on the artery. The coordinator, in accordance with one aspect of the invention, may thus store externally generated cycle length values (whether or not generated from vehicle sensing means) and apply them in sequence to control the traffic light signals at each intersection.

Figure 2:
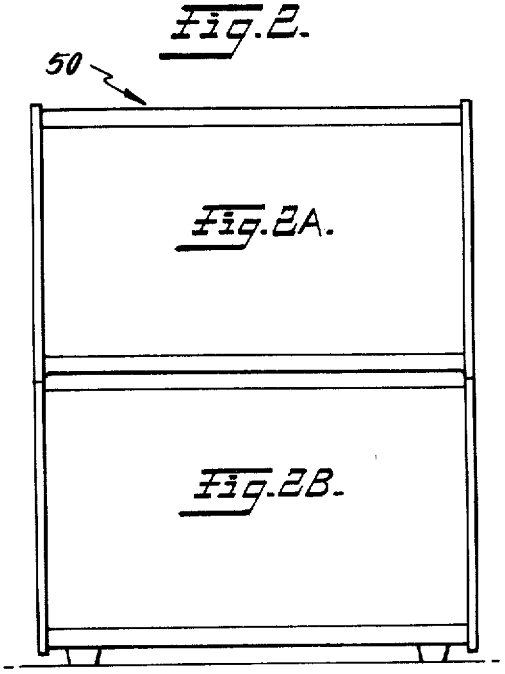
FIG. 2 illustrates the orientation of FIGS. 2A and 2B in a master unit.
Figure 3:
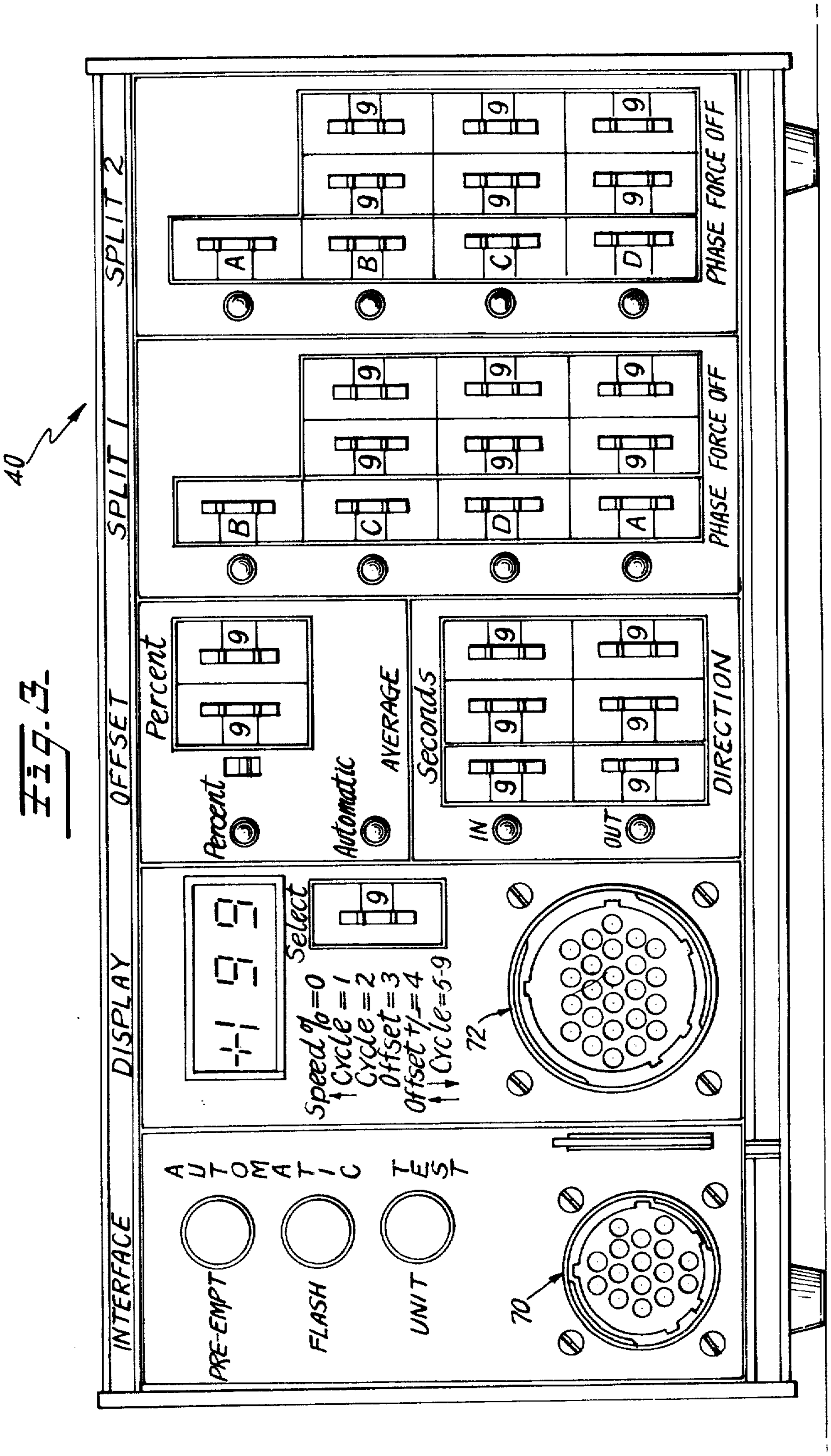
FIG. 3 is a front plan view of a secondary unit illustrating the various front panel controls of the modules utilized in accordance with the invention.

The front panel controls and interconnections of the master and secondary units are shown in FIGS. 2 and 3 respectively. The master unit 50 is seen to comprise a plurality of separate modules labeled inbound, volume, outbound, system, direction, interface, display, average, occupancy and speed. Secondary unit 40 comprises a plurality of modules labeled interface, display, offset, split 1 and split 2. Both the secondary unit 40 and the master unit 50 contain an interface module and a display module. The remaining modules in both the secondary and master units may be characterized as switch modules in that they primarily comprise a plurality of thumbwheel switches (TWS) which may be set by the operator. Additionally, these switch modules comprise individual indicators to provide various output data.

The various thumbwheel switch settings which provide input data and the various indicators which provide output data are explained more fully below wherein the various terms adjacent to the switches and indicators are described.

MODULE DESCRIPTION AND DEFINITIONS

Master Unit 50

Direction Module

Thumbwheel switches are provided on the direction module for setting the set points utilized in determining whether the coordinated system should operate in the INBOUND, OUTBOUND or AVERAGE mode. Actuations on the inbound (IN) and outbound (OUT) volume detectors are utilized in the formula IN/(IN+OUT)×100, and compared to the percentage values selected on the IN and OUT thumbwheel switches to select among the three possible modes.

The minimum green time is also settable on the direction module of the master unit. The minimum green is settable in seconds and is an overriding criteria for insuring that the arterial green period always exists for the settable minimum time.

The average sample time in minutes is settable on the direction module for two conditions. If a decision has been made to change from directional to average during a given cycle time the "INTO" thumbwheel switch selects a time period over which the decision must persist as dictated by persistent traffic conditions. The master unit will thus not enter into an average mode of operation from a directional mode unless the conditions dictating the change persists for the time period set on the "INTO" thumbwheel switch. Similarly, the master unit remains in the present average cycle length for a time period settable by the thumbwheel switch labeled "IN".

SYSTEM MODULE

The maximum side street green time is settable on two sets of thumbwheel switches, each set comprising three thumbwheel switches defining time periods set in seconds. The first set of switches is for the Split 1 condition (S-1) whereas the second set of switches corresponding to a larger side street time is for the Split 2 condition (S-2). An indicator is energized corresponding to the selected split. The master unit will automatically select the Split 2 condition if a predetermined green band is exceeded. The settable maximum side street time is essentially the Red phase (artery) time.

The system module also contains a set of thumbwheel switches utilized to set the maximum green period for the artery green as given in seconds. This maximum green period is an overriding criteria similar to the minimum green period.

The system module also contains three thumbwheel switches labeled $Y_{in}$, $Y_{out}$ and X. These thumbwheel switches are utilized to convert occupancy levels as measured by the occupancy detectors into cycle length in seconds. The Y values correspond to a percentage value having a cycle length equal to the maximum green time setting, and the X switch corresponds to a percentage of cycle length corresponding in time to the minimum green time in seconds.

INBOUND AND OUTBOUND MODULES

The inbound and outbound modules are essentially identical and apply to the inbound and outbound directions respectively. The upper pair of thumbwheel switches is utilized to set a time value in which an initial gap time between cars is linearly reduced to a minimum gap time between cars. Thumbwheel switches are separately provided to set both the initial gap in seconds and the minimum gap in seconds as well as the time to reduce in a linear fashion from the initial gap to the minimum gap. If the gap between any two cars exceeds the time allowed for the gap then a "gap out condition" occurs which, under certain circumstances, terminates the green artery phase.

Separate thumbwheel switches are also provided to allow a time period settable in seconds for the last car passage. This time interval effectively enables a car just crossing a volume detector to pass through the intersection prior to its turning red. The last car passage time is thus added to a green band calculated on volume figures and/or occupancy figures. After a gap out condition is recognized, a time which is equal to the front panel setting of the last car passage is typically added to the green band after which the green period terminates. A last car passage time of at least two seconds is provided even if the front panel thumbwheel switches are set to less than two seconds.

VOLUME MODULE

The volume module is divided into an inbound portion and an outbound portion wherein each portion contains pairs of thumbwheel switches labeled red and green. These thumbwheel switches correspond to headway settings in seconds for the red artery time and the green artery time in both inbound and outbound directions. The red headway time essentially corresponds to the amount of time alloted a car which passes a volume detector during an artery red. The headway time given for a vehicle actuating a volume detector during the green period (green headway) is typically less than the red headway time inasmuch as the vehicle is already moving and less time would be required for it to enter and pass through the intersection.

OCCUPANCY AND SPEED MODULES

The occupancy and speed modules contain corresponding sets of thumbwheel switches to permit the master unit to direct speed changes to the secondary units. In principal one wishes to increase the traffic flow speed to compensate for increased occupancy values. A change in the speed of the system will effectively increase or decrease the offset of the secondary units from the offset figure initially put in on the secondary unit thumbwheel switches. Each occupancy value, expressed in percent of occupancy, on the master Occupancy module corresponds to an adjacent percent speed change on the Speed module of the master unit. Four separate speed modifier settings are possible. 100% indicates no modification; 101% to 199% indicates an increase while 000 to 099% indicates a decrease in system speed. The effective speed modification percentage is indicated by an energized indicator (LED) adjacent to the selected thumbwheel switches.

AVERAGE MODULE

The average module is utilized to set four different average cycle lengths in seconds, one of which is selected by the master unit during the AVERAGE mode of operation. A maximum cycle length of 299 seconds may be selected. One of the four presettable cycle lengths is selected depending upon which one is closest to the calculated value of (IN+OUT)/2 where the IN and OUT values are the larger of either the volume cycle length value or occupancy cycle length value. The presettable values on the average module may be optimally determined using a nomograph supplied by TESCO of Alexandria, Virginia and described in U.S. Pat. No. 4,122,994 incorporated herein by reference.

DISPLAY MODULE

The numeric display located on the face of the disply module indicates the following parameters as enabled by the adjacent select switch. For cycle lengths in excess of 199 seconds a + (plus) is activated indicating numbers of 200 to 299. For parameters expressed in percentage a − (minus) is activated. A flashing display denotes manual override operation.

Ten selectable parameters from throughout the unit are available and appear on the 2½ digit display of this unit.

The ten position selector shall be assigned as follows:

| | | |
|---|---|---|
| 3 | An alternate display of Vol./Ocp. in seconds | INBOUND |
| 2 | An alternate display of Occupancy expressed in Sec./% | INBOUND |
| 1 | Green band in seconds derived from volume | INBOUND |
| 0 | Present effective green band in seconds | INBOUND |
| 9 | Green band in seconds derived from volume | OUTBOUND |
| 8 | An alternate display of Occupancy expressed in Sec./% | OUTBOUND |
| 7 | An alternate display of Vol./Ocp. in seconds | OUTBOUND |
| 6 | Gap value in seconds and tenths of seconds | |
| 5 | Present effective cycle length in seconds | |
| 4 | An alternate display of $T_r$ in Sec./ $\frac{IN}{IN + OUT}$ in %. | |

This computation is based on IN and OUT vehicle counts per each cycle.

SECONDARY UNIT

Split 1 and Split 2 Modules

The Split 1 module is utilized to allow setting of various force-off times in seconds for associated phases of the intersection. The top thumbwheel switch is reserved for the artery phase whereas the bottom three sets of thumbwheel switches are reserved for side street phases. The Split 2 modules is essentially identical to the Split 1 module although different force-off times may be utilized. Typically, the Split 2 module has a longer side street service time for the arterial traffic flow which may correspond also to a larger green time dictated by the master unit.

The phase thumbwheel switches permit association of the artery phase (as well as the side street phases) from the secondary unit 40 to the controller without the need for special logic circuits or wiring changes. Identical secondary units 40 may thus be employed for use at intersections wherein controllers have any assignment of artery and side street phases.

OFFSET MODULE

The offset module of the secondary unit has a plurality of thumbwheel switches for setting the offset time for inbound and outbound traffic with respect to a reference point. The reference point may, for example, be any point in the system not necessarily physically associated with the master unit location and is typically selected to be at the first intersection for inbound traffic flow or at the first intersection for outbound traffic flow. The offset is set in seconds by simply dividing the distance from the reference point by the velocity of traffic flow. Percent offset may also be selected during the average mode of operation utilizing the two thumbwheel switches provided in the offset module. Indicators are energized adjacent the inbound and outbound offset directions depending upon which is in effect at the time. Additionally, a percent and automatic indicator are provided to correspond to the percent offset and for the automatic computation of average offset when in the Average mode.

DISPLAY MODULE

A two and one-half (2½) digit numeric display is provided on the display module to indicate the following information when selected by an adjacent selector: A plus indication displayed along with the 1 in the most significant digit position implies the value 2=200.

SELECTOR POSITION

0—Effective speed warp in % to 199%.

1—Incrementing secondary cycle in either seconds or %.

2—Effective cycle length in seconds.

3—Offset in seconds (Difference between Master and Secondary units in seconds.)

4—Offset transition, i.e., necessary correction expressed in seconds and updated each cycle. Will normally be 0 when no transition is underway.

SELECTOR POSITION 5 THRU 9:

Incrementing arterial phase followed by decrementing side street phase intervals in seconds or %.

Positions 5 thru 9 enable settable standby cycle lengths of 50 thru 90 seconds respectively. Positions 0 thru 4 enable a standby cycle length of 40 seconds.

The standby cycle length is in effect upon initial turn on of the unit and upon a communications failure that has exceeded time out. Operation in standby is indicated by the appearance of the "minus" sign preceding the numeric display.

INTERFACE MODULE - MASTER AND SECONDARY

The interface and display modules of the secondary unit 40 comprise two I/O pin connectors 70 and 72 respectively. Similarly, the interface and display modules of master unit 50 have I/O pin connectors 80 and 82 respectively. I/O pin connector 70 of each secondary unit is interconnected to the I/O pin connector 80 of the master unit via the communication path 52 (FIG. 1), and the I/O pin connector 72 of each secondary unit is interconnected to its associated controller 32 via conductors 42. I/O pin connector 82 of the master unit is interconnected to the various vehicle detector lines L18*a-b*, L20*a-b*, L22*a-b* and L24*a-b*. Each display module is seen to further comprise a display and a thumbwheel selector switch. The interface module of both the secondary and master units are seen to comprise, in addition to the I/O pin connectors, a plurality of manual buttons. For the master interface module manual override buttons are provided in the form of slide switches, and in the secondary interface module spring loaded pushbutton switches are provided for automatic test purposes.

SYSTEM HARDWARE DESCRIPTION

Figure 4:
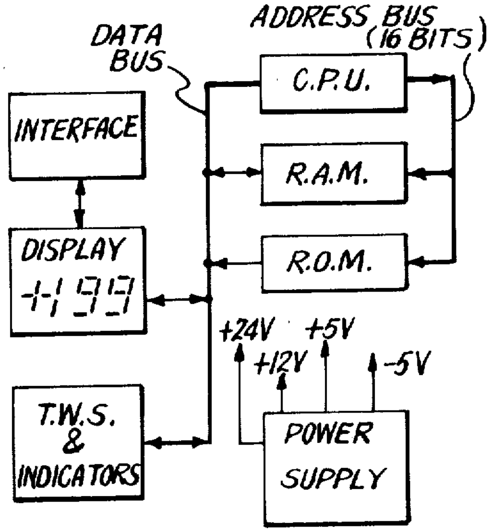
FIG. 4 is a block schematic diagram of the different types of modules utilized in the master and secondary units.
Figure 2A:
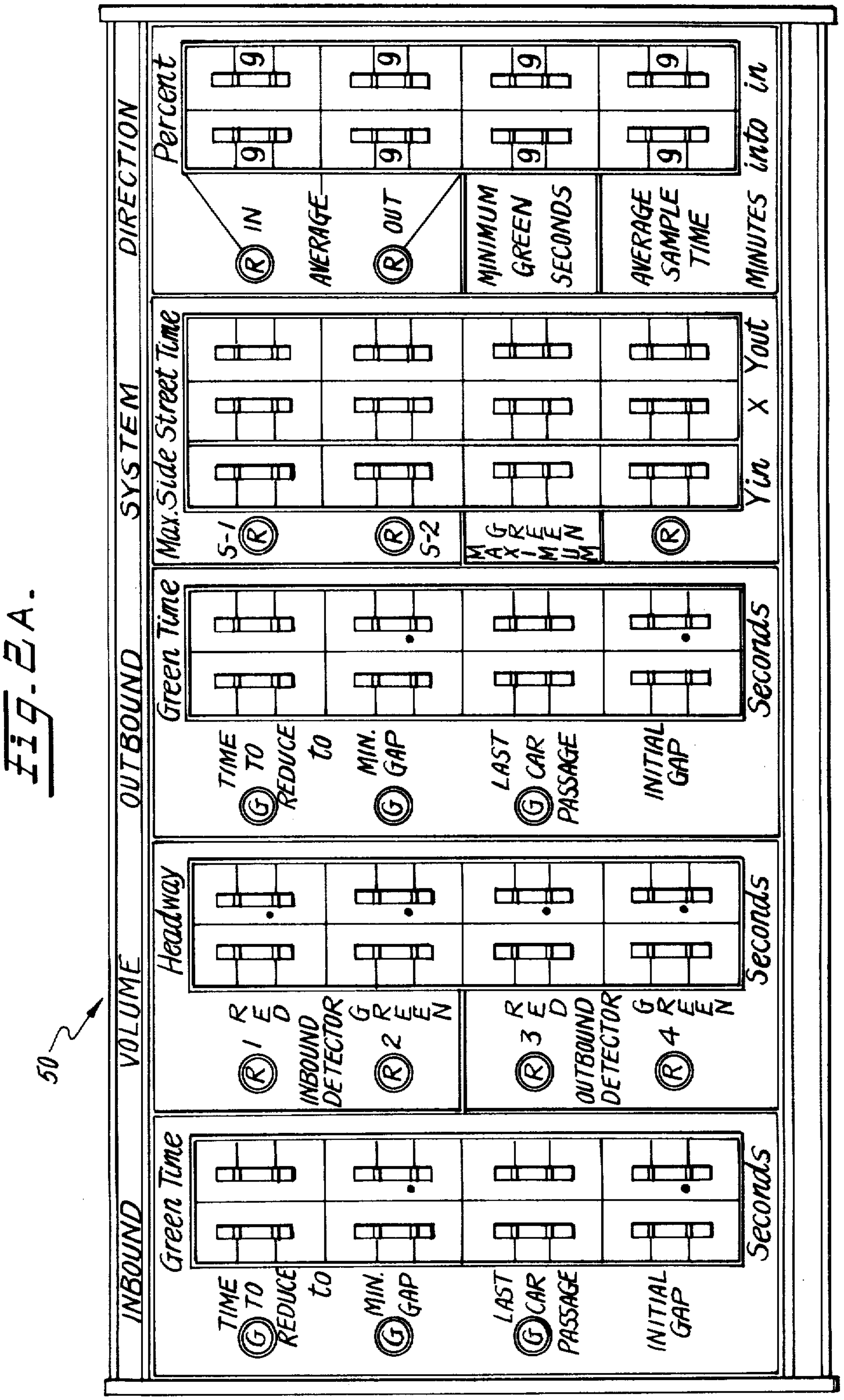
FIGS. 2A and 2B are front plan views of the modules employed in accordance with the invention.
Figure 2B:
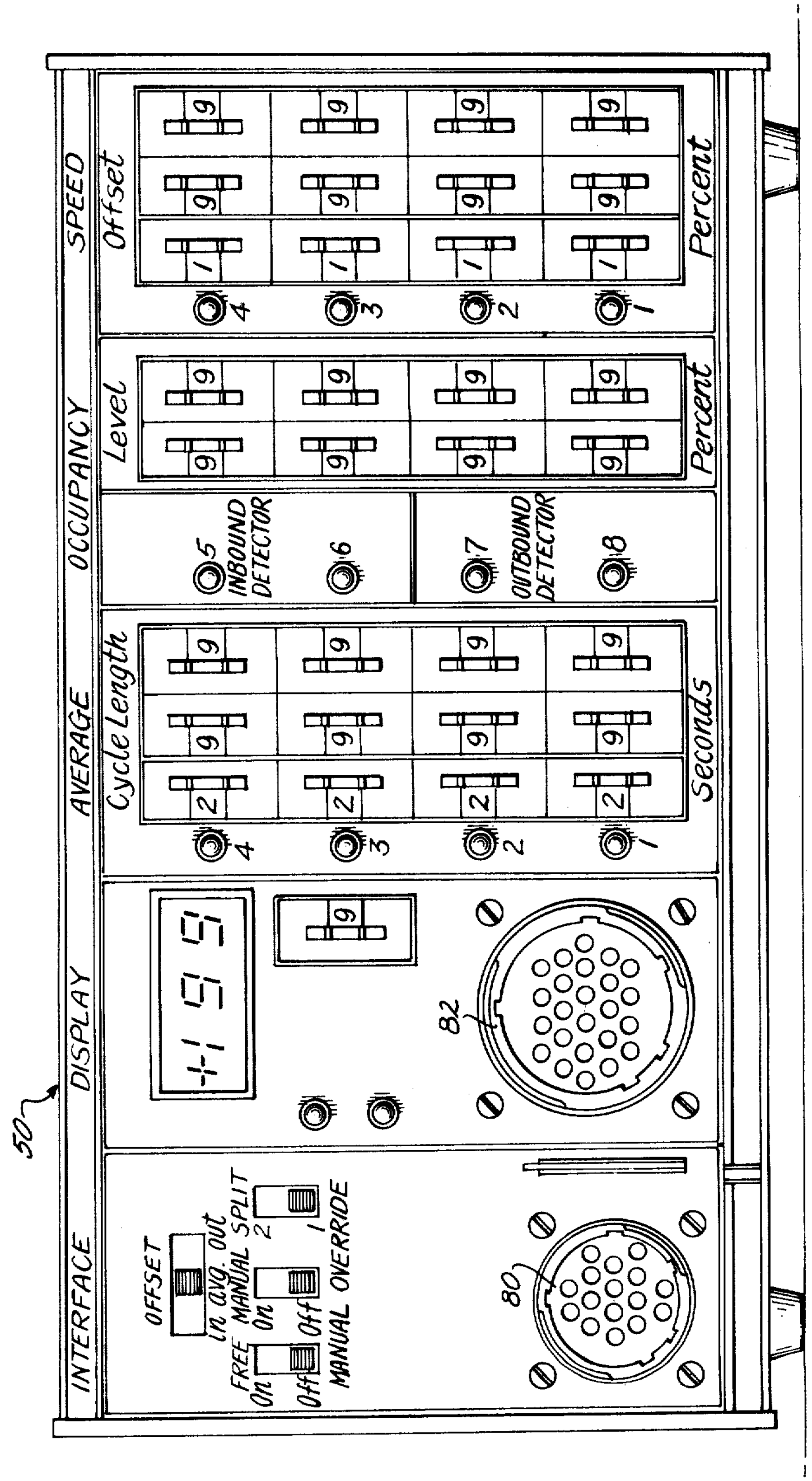

FIG. 4 shows a block schematic diagram of the various modules which are represented in both the master and secondary units. Both the master 50 and secondary 40 each have an interface and display module, the front panel of which is shown in FIGS. 2 and 3 respectively. The remaining modules shown in FIGS. 2 and 3 are switch modules and are of the same general type described in detail hereinbelow. The master unit 50 and secondary unit 40 also comprise modules which are internal to the units and have no front panel access. These internal units (which may have rear panel access, for example) include a CPU module, RAM module, PROM module and power supply modules. Consequently, FIG. 4 is representative of a block diagram for both the secondary unit 40 and the master unit 50. In this connection it is emphasized that the secondary unit and the master unit each contain computing means and memory storage means. Each secondary unit is, of course, programmed identically with the necessary input parameters for each secondary unit fed into its CPU via the front panel thumbwheel switches as available on the switch modules and via connections to the master unit from the interface module. The master unit 50 is programmed to control the secondary units 40 in such a fashion as to provide a system control consistent with the design objectives as explained more fully below.

Figure 5:
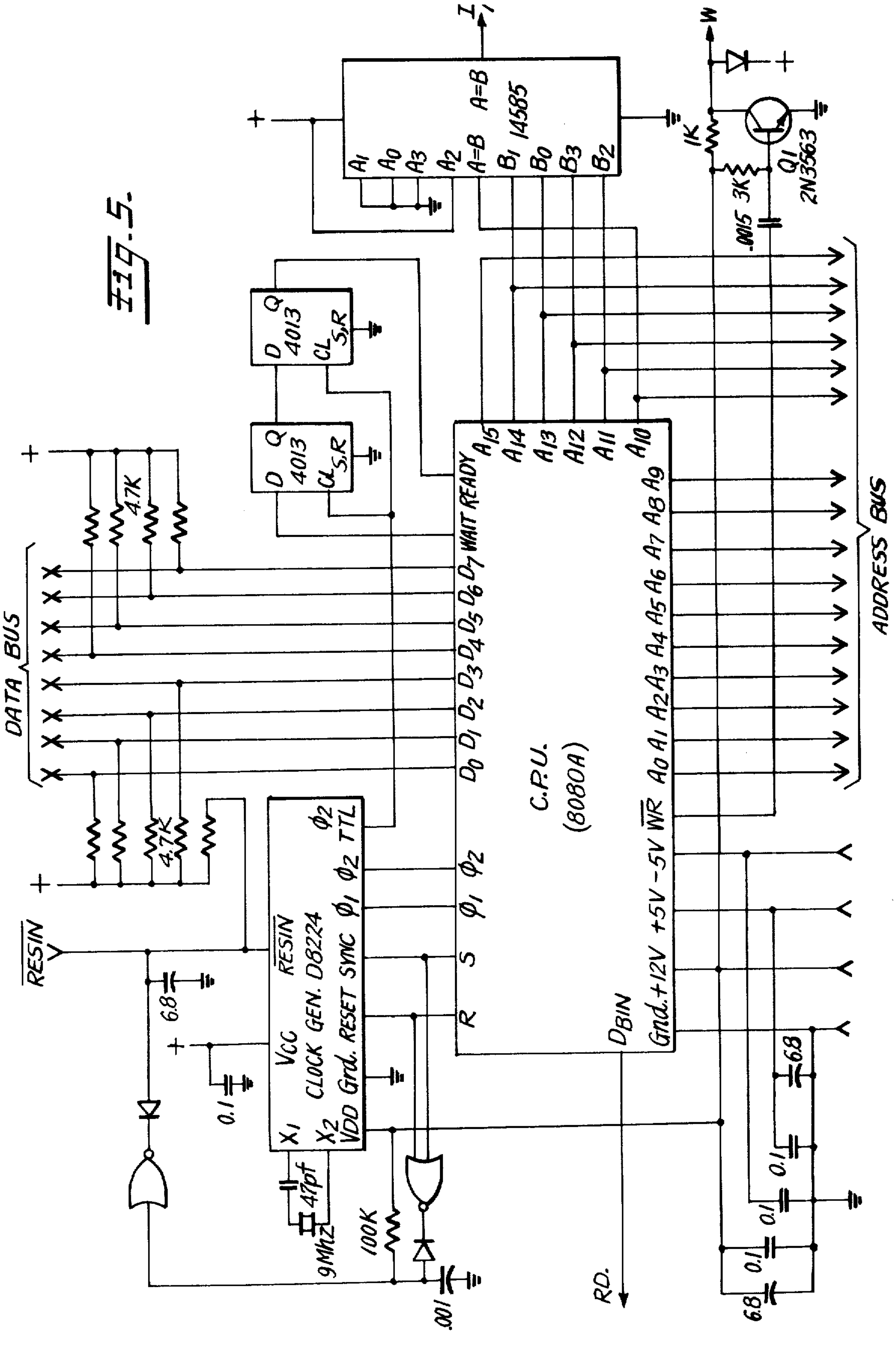
FIG. 5 is a schematic diagram of the central processor utilized in the master and secondary units in accordance with the invention.

FIG. 5 illustrates the CPU module which is utilized in both the master and secondary units. The CPU module may comprise for example, an Intel Model 8080A microprocessor together with its associated clock generator Model 8224. For a complete explanation of the operation and use of the microprocessor, reference is made to the Intel 8080 Systems User Manual published by Intel Corp., Santa Clara, California and incorporated herein by reference. The WAIT output of the microprocessor is fed to two "D" flip-flops Model 4013 which are clocked utilizing the TTL phase 2 output of the clock generator. The Q output of the second series flip-flops is utilized to provide the "ready" signal to the microprocessor. The effect of the two flip-flops is to extend the allowable response time for CPU associated RAM, PROM and I/O, in order to provide reliability of operation for the overall system and to permit the use of slower, commercially available components.

Address lines A0–A15 are utilized to address various other modules and memory locations in the master and secondary units. Communications between master and secondary units utilize data lines D0–D3 which are also used for all I/O. Data lines D0–D7 are used for data communication to PROM and RAM. Address lines A10–A14 are fed to comparator, Model 14585, and are utilized to provide an I/O command signal along line 90. The I/O command signal must be present during all I/O operations. Read and write strobes are also provided from the CPU along the RD and WR lines respectively.

Figure 6A:
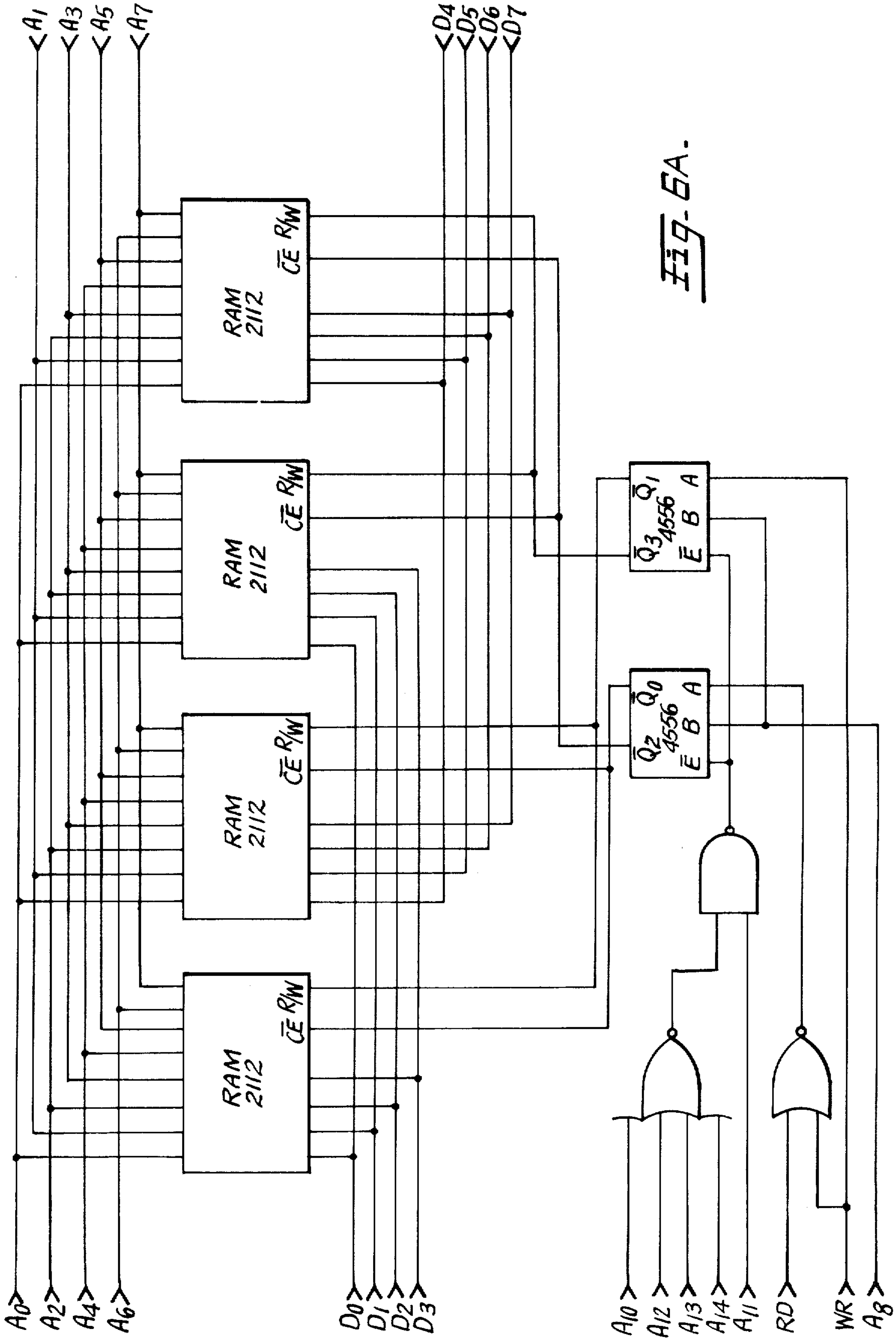
FIG. 6A is a schematic diagram of a random memory storage means utilized in the master and secondary units.

FIG. 6A is representative of a RAM memory module utilizing for example a plurality of 256×4 static MOS RAMs, Intel Model 2112. The chip enable and read/-write inputs are provided via decoders, Model No. 14556, conditioned by address lines A8, A10–A14, the read strobe RD and write strobe WR. Data and address lines are interconnected to the memory chips in a conventional manner as shown.

Figure 6B:
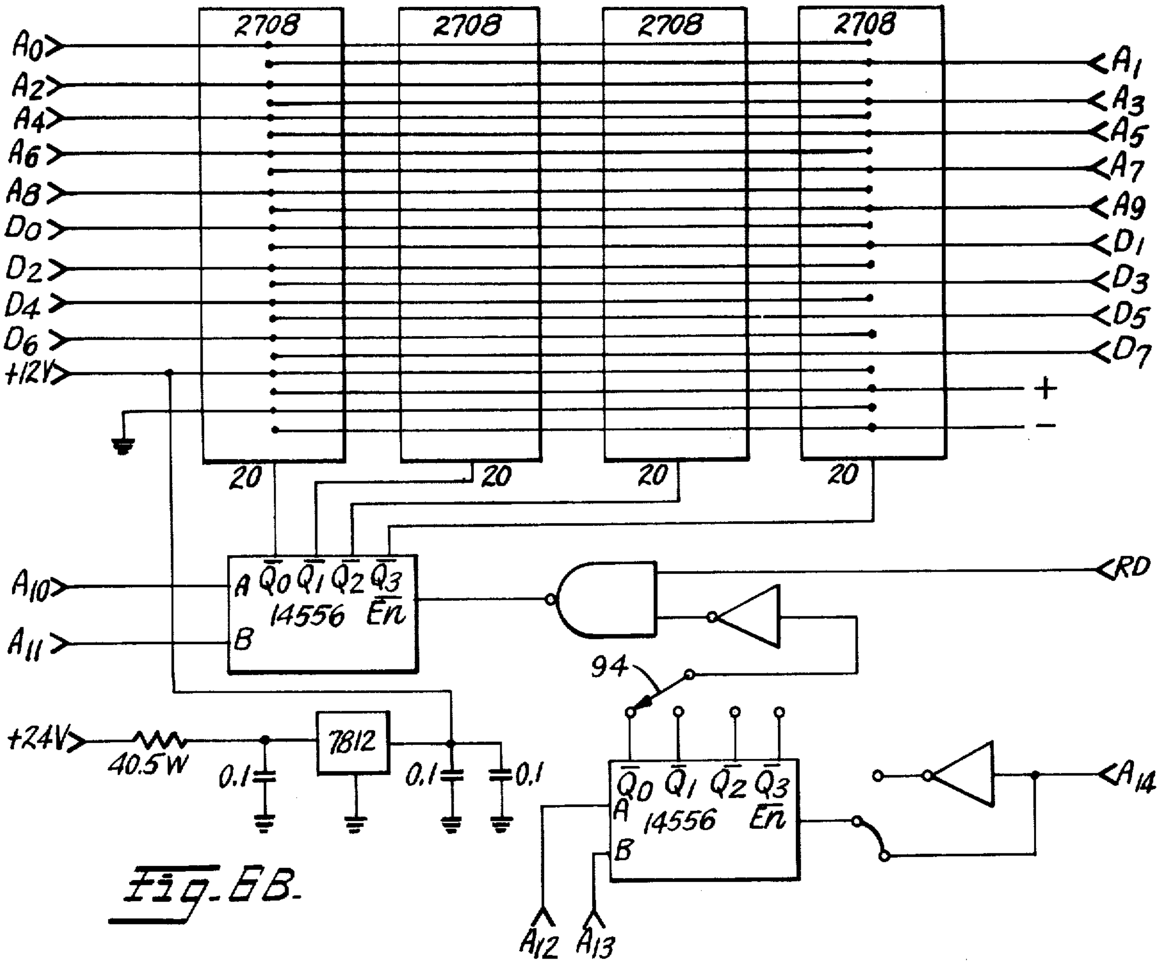
FIG. 6B is a schematic diagram of a programmable read only memory utilized in the master and secondary units.

An exemplary PROM module is illustrated in FIG. 6B. The module is seen to comprise a plurality of 1024×8 MOS erasable PROMs such as Model No. 2708 (Intel), and decode logic circuitry consisting of Model No. 14556 decoders and NAND gates as shown. A 12 volt regulator Model 7812 is also provided. Typically, three or four PROM circuit boards may be provided each as shown in FIG. 6B. A switch means 94 is provided to enable addressing of a desired circuit board.

Figure 7:
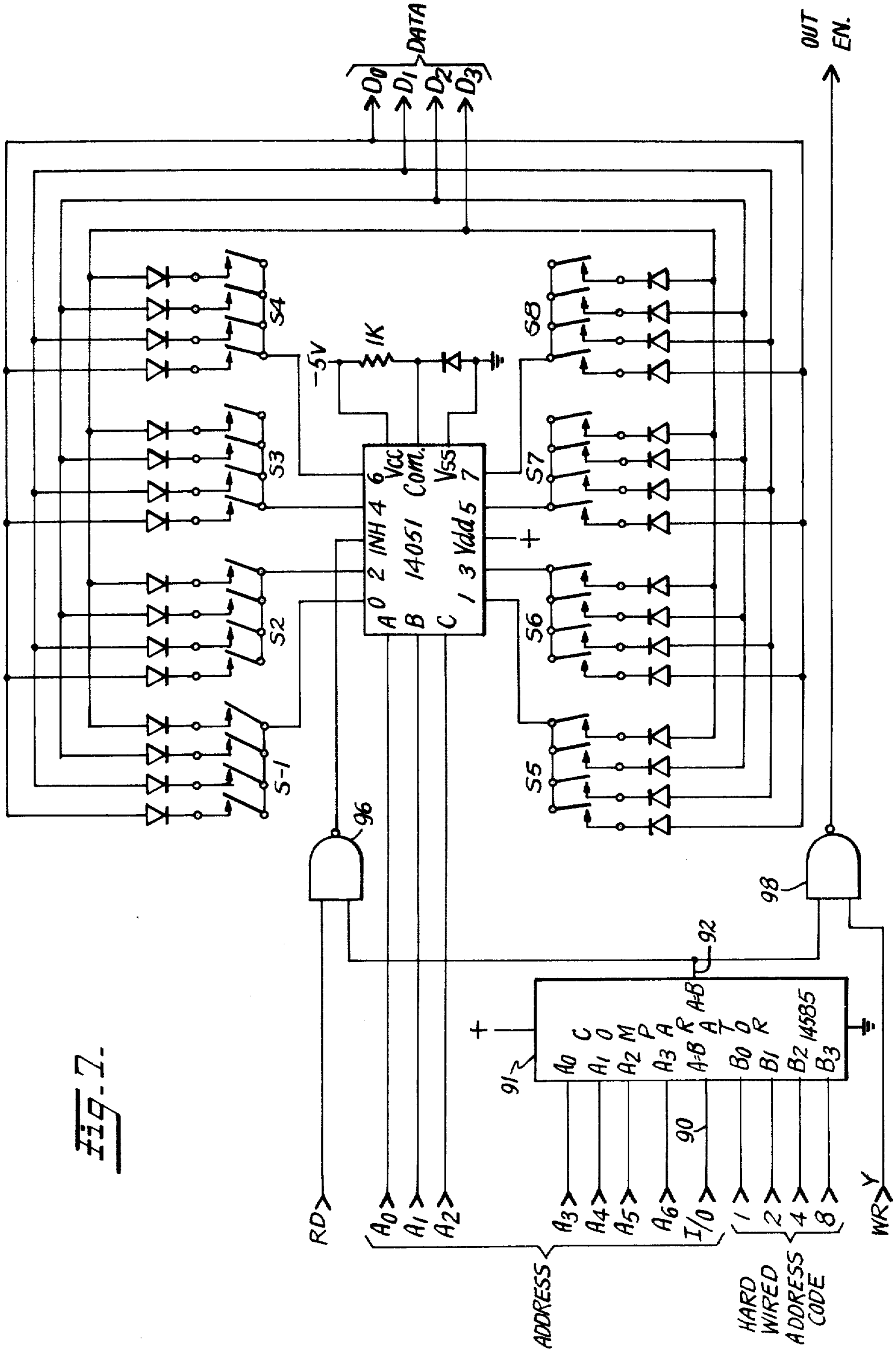
FIG. 7 is a schematic diagram of a switch module in accordance with the invention.

A detailed schematic diagram of a switch module (inbound, outbound, etc.) is illustrated in FIG. 7. The circuit shown in FIG. 7 is positioned on a single printed circuit board and is capable of reading eight different thumbwheel switches. Within certain modules, two printed circuit boards of the type shown in FIG. 7 are required wherein any excess switch reading capabilities are ignored. For example, the outbound module of master unit 50 (FIG. 2) contains a single printed circuit board as shown in FIG. 7. The system module of the master unit, however, requires two boards with the resulting capability of reading sixteen thumbwheel switches. In practice, only twelve swithces need be read so that the circuitry for the remaining four switches is not utilized.

FIG. 7A shows the position of the switches which are labeled S1–S8 and are addressed respectively by the binary number 0–7. Each switch module contains a four bit comparator 91, Model No. 14585, for example, which compares the address code along the address lines A3–A6 with a hard wired address code unique to each particular switch module location. Consequently, the address bits A3–A6 are compared with the four bit hard wired code, and, if equal, an output strobe is provided along line 92. The I/O command along line 90 is also fed as a conditioning input to the comparator 91. The output of the comparator 91 goes high whenever the address matches the hard wired address code, so that a logical 1 is placed along a line 92 and fed to NAND gate 96. A second input to NAND gate 96 comes from the read strobe RD so that its output goes low whenever the particular switch module is addressed for reading. The low signal from the NAND gate 96 is fed to an analog mux/demux Model No. MC14051 used as a three-to-eight data selector. Depending on the particular code appearing on the address lines A0–A2, one of the switches S1–S8 is selected which subsequently provides an output along the data lines D0–D3. These data lines, of course, are part of the bidirectional data bus and are fed to the CPU shown in FIG. 5.

Figure 8:
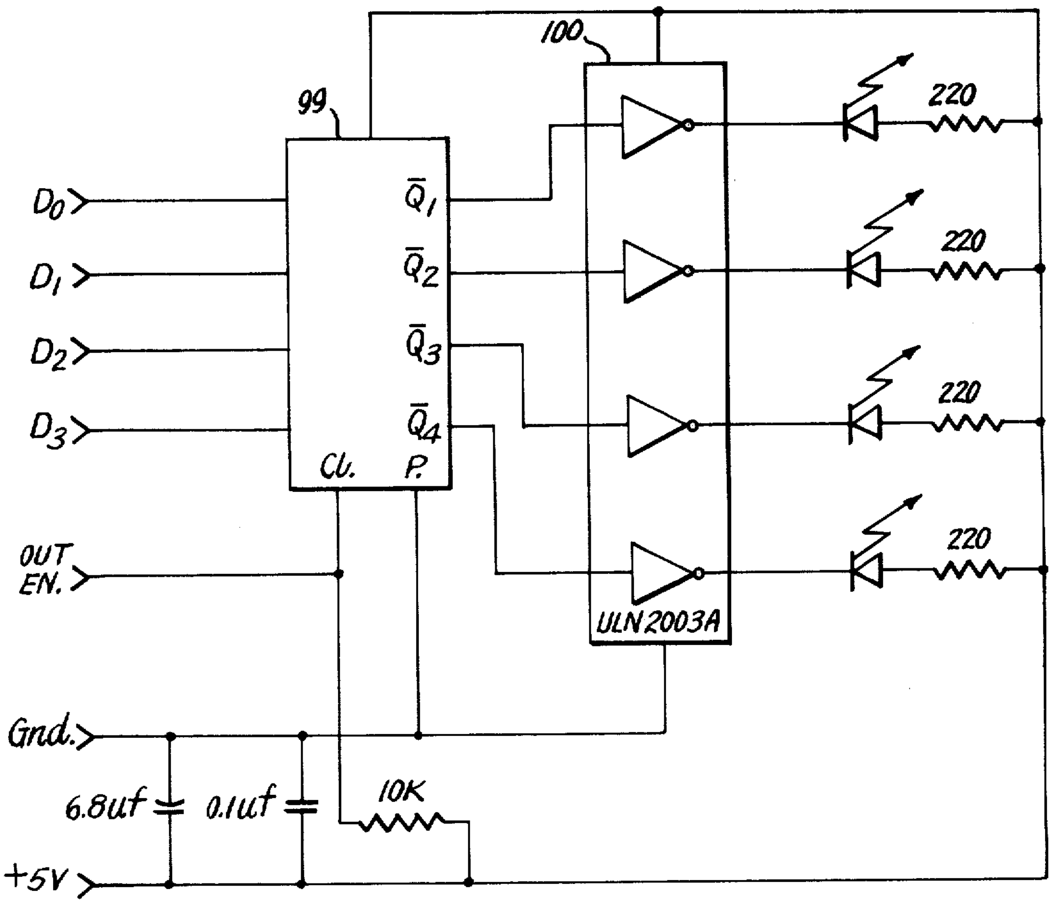
FIG. 8 is a schematic diagram of the LED display circuitry.

The output of the comparator 91, along line 92 is also shown connected to another NAND gate 98. The second input to this NAND gate is the write strobe WR. The output of NAND gate 98, the output enable signal, is fed to a quad display circuit during an output or write command. In reference, for example, to master unit 50 it is seen that the outbound module contains eight thumbwheel switches and three display indicators. The eight thumbwheel switches are simply the switches S1–S8, whereas the display indicators are shown in FIG. 8 and form part of the quad display circuitry. Thus, each switch module in both the master and secondary units contains at least one quad display and a maximum of four indicators may occur on any given module. The output enable signal is fed to a quad latch 99, for example, Model No. 14042 to latch the write data appearing on the data lines D0–D3. The latched data is fed to power inverter 100, for example Model No. ULN2003A (Sprague) which subsequently feeds indicating diodes D1–D4. In this manner, the hard wired address code provided as an input to the comparator 91 of FIG. 7 serves to direct the address decoder for both the switches S1–S8 and the indicators D1–D4.

Figure 9A:
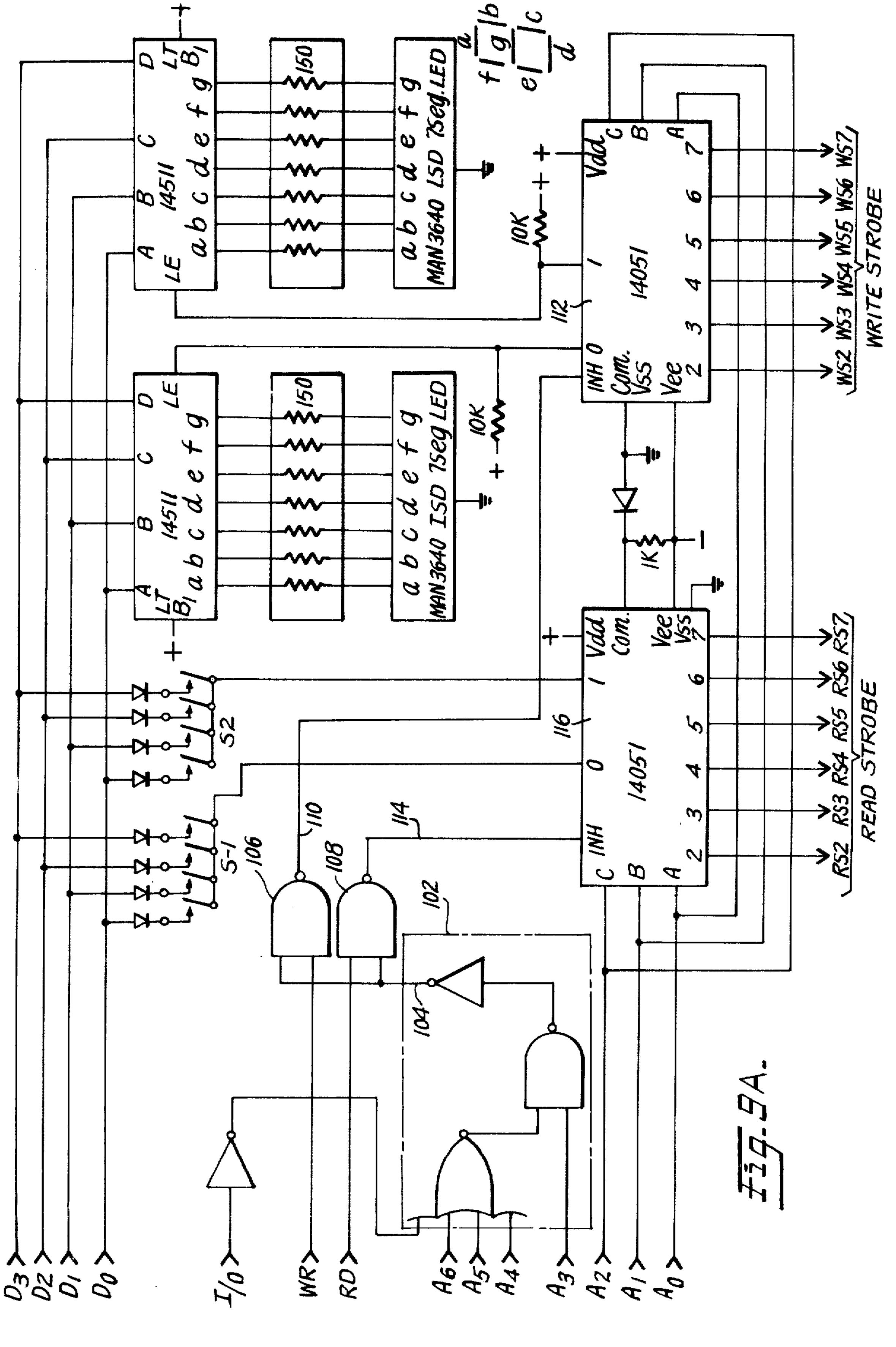
FIGS. 9A-9D are schematic drawings for the circuitry in the display module of the master and secondary units.

The display module is shown in detail in FIGS. 9A–9D. FIG. 9A illustrates the address decode for the display module which is implemented by logic circuit 102 utilizing address lines A3–A6. Additionally, the command I/O is provided as an input to the logic circuit 102. The output of the logic circuit 102 is fed along line 104 to NAND gates 106 and 108. NAND gate 106 is provided with an input from the write strobe WR and NAND gate 108 is provided with an input from the read strobe RD. The output of NAND gate 106 goes low whenever the display module is being addressed and a write command is to be implemented. The low or logically zero output is fed along line 110 to the inhibit input of an analog mux/demux 112 (Model 14051 for example used as a three-to-eight decoder). Decoder 112 provides a plurality of write strobes WS to be utilized with additional circuitry of the display module. These write strobes are identified by their binary decode so that decode 2 corresponds to write strobe WS-2 etc.

In a similar fashion the output of NAND gate 108 provides a logically zero output along line 114 to the inhibit input of decoder 116. Decoder 116 provides a plurality of read strobes RS, for use with additional circuitry in the display module. The particular line selected from the decoders 112 and 116 is dependent upon the address appearing on address lines A0–A12. The read strobe lines are also identified by their address decode. The circuitry shown in FIG. 9A is common to both the master and secondary display modules.

As may also be seen in FIG. 9A, two thumbwheel switches S1 and S2 are provided and are shown connected to the decoder 116. If a read command is given to the display module, these switches S1 and S2 may be addressed from address lines A0–A2 as address # zero and one respectively. Upon selection of either switch S1 or S2 the input lines to the decoder 116 are fed to the common pin 3 terminal of 116 so that the data bus D0–D3 may carry the BCD signal generated by each thumbwheel switch. It is noted that switch S1 is optional and is not utilized in the display modules for the secondary or master units as shown in FIGS. 2 and 3 respectively. Upon issuance of a write command the decoder 112 may be activated by address lines A0–A2. A decode of a binary zero or one is used to display one of two digits of the three digit seven-segment display shown for both the master and secondary display modules. The circuitry of FIG. 9A may be utilized to select either the intermediate significant digit (ISD) or at least significant digit (LSD) of the seven-segment display. The display circuitry for the ISD and LSD may comprise Model No. 14511 BCD to seven-segment decoder/driver, a resistor dropping network, and seven-segment LED display, Model No. MAN 3640A (Monsanto).

Figure 9B:
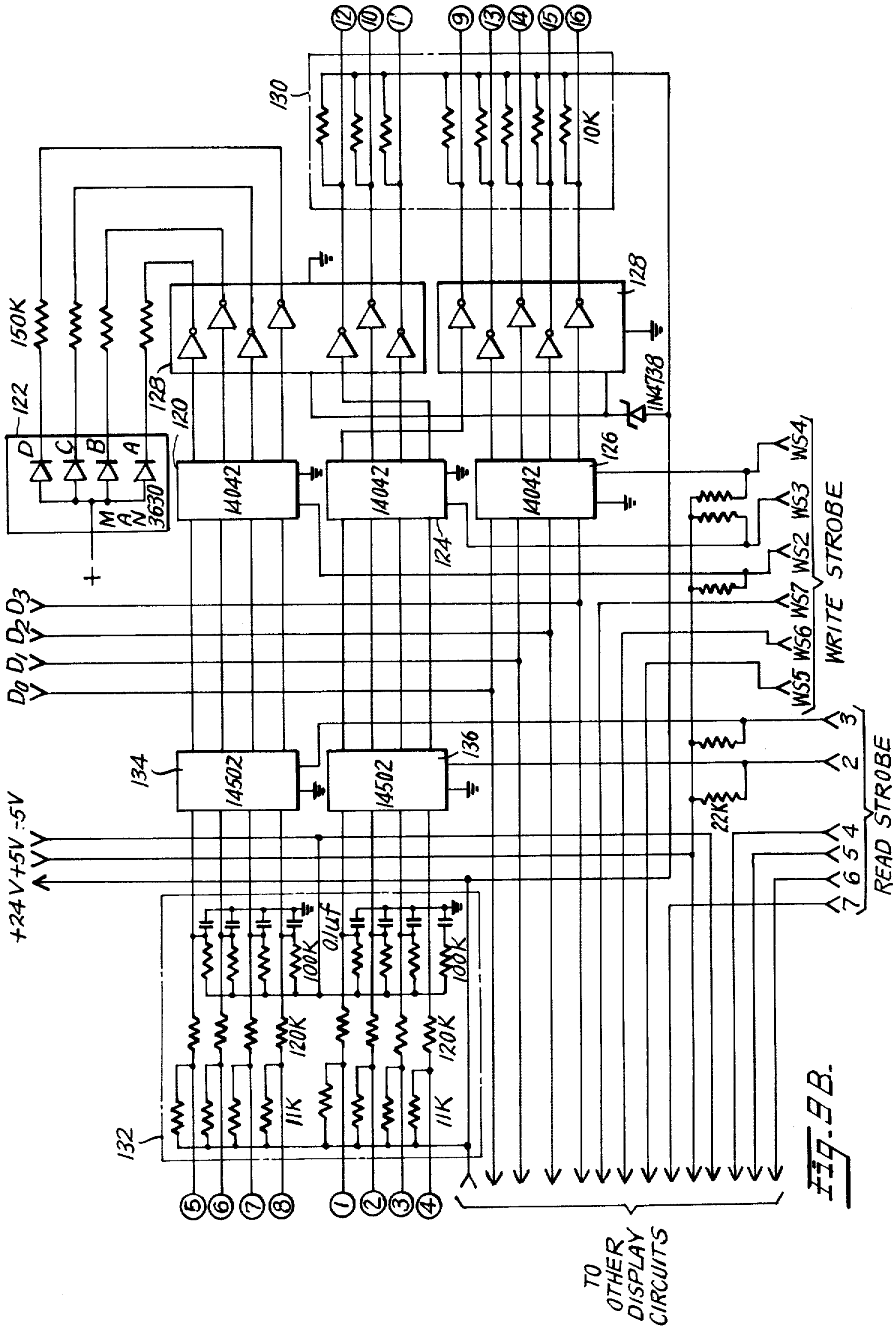

FIG. 9B illustrates additional circuitry for the display module which is common to both the master and secondary units. The circuitry of FIG. 9B controls the most significant digit in the seven-segment display as well as the "+" sign. The write strobe WS2 is utilized to activate a quad latch 120 (Model 14042) to drive LED display 122 (Model MAN3630A). Additional latches 124 and 126 are strobed by write strobes 3 and 4 to provide 24 volt level output on connectors labeled ⑨-⑯. For the master unit 50, these 24 volt level output lines are fed to the I/O pin connectors 82 whereas for the secondary unit 40 these 24 volt output level lines are fed to the I/O pin connectors 72. The current sinks operating from a 24 volt level are provided on these output pin connectors from the 5 volt logic signals provided from the latches 124 and 126 via power inverters 128 (Model ULN2003A) and resistor network 130. Thus, these write strobes are utilized to provide output data either to the display 122 or the 24 volt output level lines. The data originates from the data bus D0–D3. Various additional write strobes are fed to other circuitry within the display module as to be described hereinbelow.

FIG. 9B illustrates some of the read strobes which are utilized to latch input data into the data bus D0–D3. The input data is provided to the master or secondary via I/O pins 82 or 72 respectively which pins are connected to lines ①-⑧ as shown. The 24 volt level signal is passed through conditioning circuit 132 to translate the voltage level to 5 volts as utilized for inputs to the strobed inverter buffers 134 and 136. Input data from these buffers is fed to the CPU along the data lines D0–D3.

Additional read/write strobes are passed to still other circuitry of the display module to be described hereinbelow.

Figure 9C:
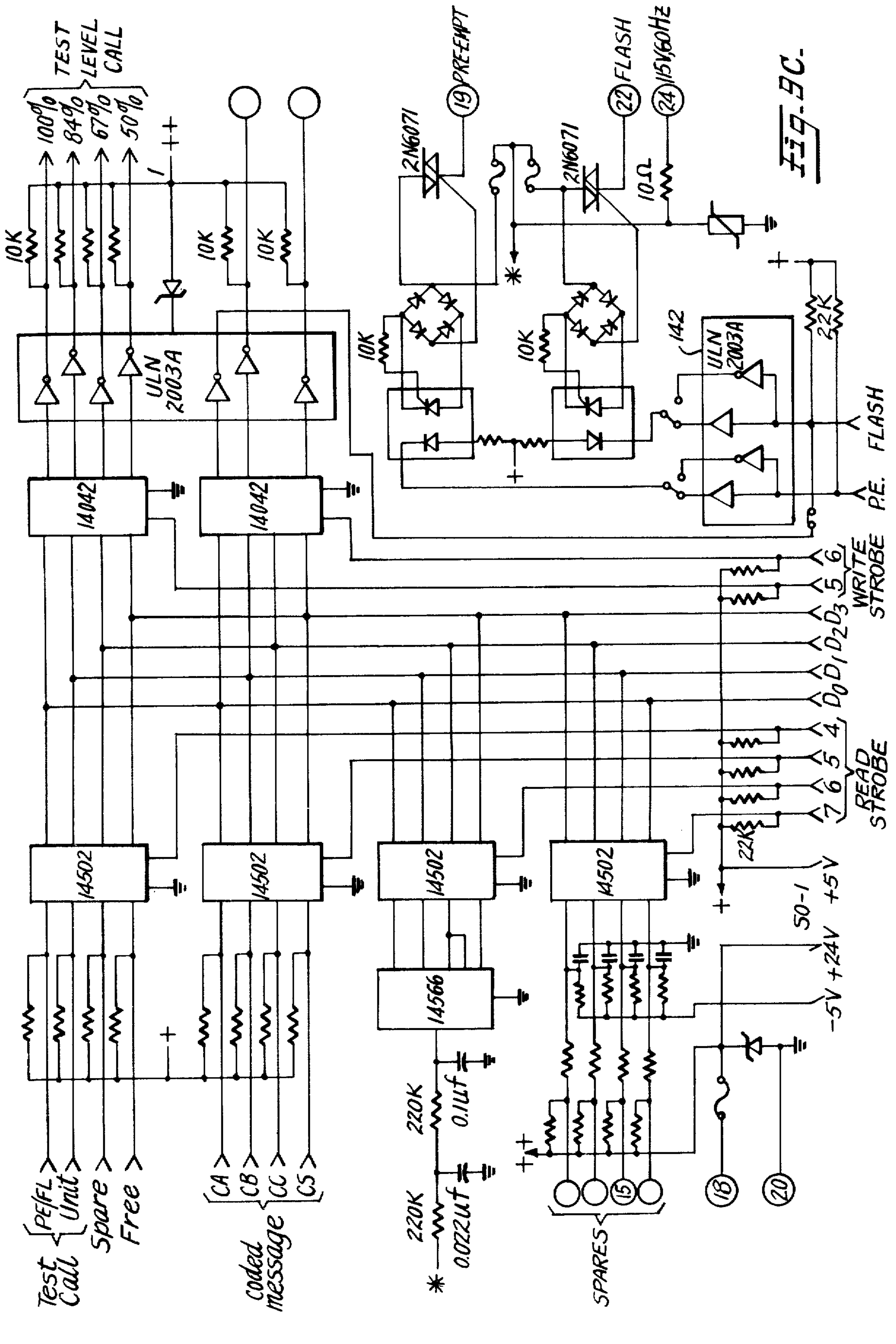

FIG. 9C illustrates additional circuitry for the display module which is applicable to the secondary units. Write strobes WS5 and WS6 are utilized to feed data from the data line D0–D3 to the interface module and I/O pins 72 respectively. The I/O pin outputs are spares and may be available for additional expansion of the system. The 24 volt level outputs to the interface module are provided by power inverters and resistor networks as in FIG. 9B. The four outputs conditioned by WS5 comprise the test level call signals which test operation of the secondary interface modules at 100%, 84%, 67% and 50% voltage levels. Write strobe WS6 is utilized to strobe a data code for activating a flash call generated by the secondary software. The flash call would be generated, for example, under system software control if the controller associated with the particular secondary did not respond to force-off commands and additionally failed to respond to the interval advance procedure. The D0 bit in the data bus line together with the write strobe WS6 would provide a signal along line 140 through power driver circuit 142 and solid state relay circuit 144. The output of solid state relay circuit 144 along pin ㉒ provides a 115 V 60Hz source to the controller 32 for calling the flash condition.

Read strobes are also shown in FIG. 9C for strobing in the test call information and coded message data from the secondary interface module. The coded message data originates from the master data bus and is transmitted to the interface module of the secondary units via communication path 52. Read strobe RS4 is utilized to strobe in the test call information whereas read RS6 is used to strobe in the coded message information. Read strobe RS5 strobes 60 Hz sync data to enhance synchronization of operation of the master and secondary units. Read strobe RS7 is utilized to gate in additional input data from the I/O pin connector 72. Spare pins are also provided.

Figure 9D:
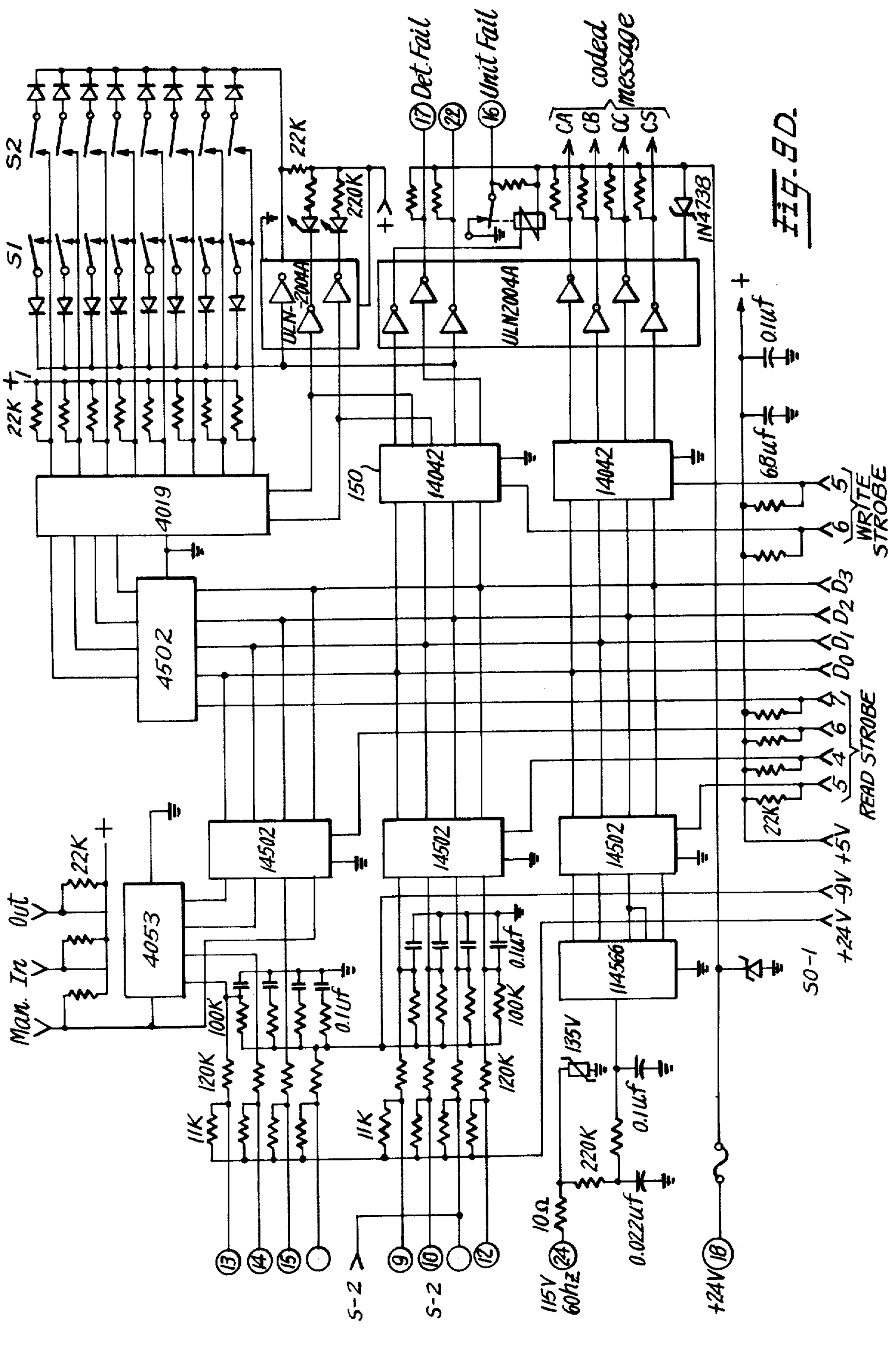
Figure 17:
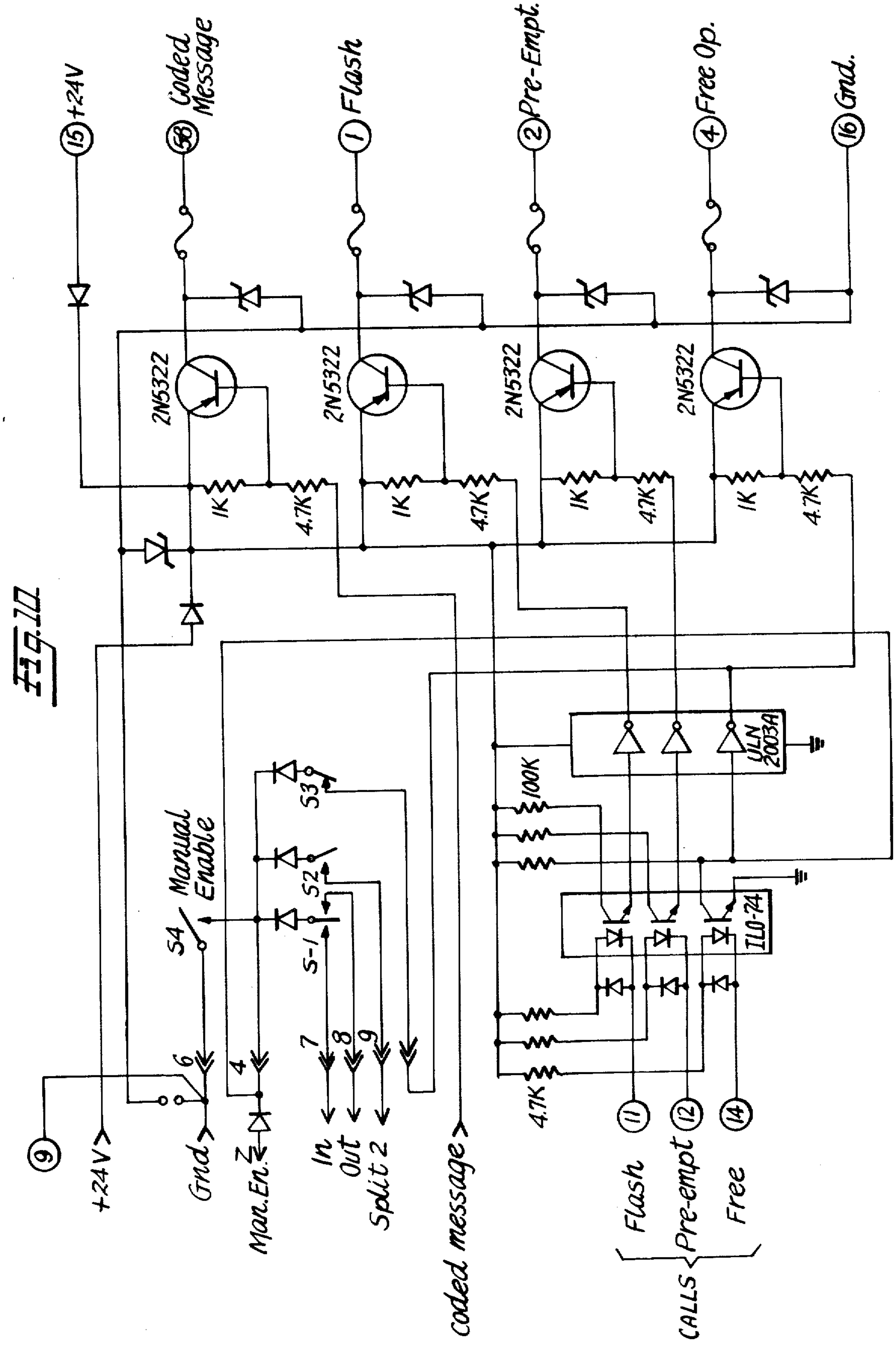

FIG. 9D illustrates additional display module circuitry which is applicable to the master unit only. Write strobe WS5 latches output data from the data bus D0–D3 to provide 24 volt level data which is the coded message transmitted to the secondary (via the master interface module and I/O pin connector 80). Write strobe WS6 is utilized to gate failure detection data to the master I/O pin connector 82 output via latch 150 and a power inverter and resistor network as shown. Additional output data may be provided by the write strobe WS6 and latch 150 to energize the indicators D17 and D18 which appear on the face of the master display module. Latch 150 also controls the selection of groups of behind front panel switches 152 to provide data to the master unit CPU permitting external programming for system data which typically will not change once the system is installed. For example, these switches may be used to store a BCD code for instructing a change from Split 1 to Split 2 operation. The data is selected utilizing a quad select gate, for example, Model No. CD4019.

Also illustrated in FIG. 9D are the read strobes which provide additional information to the master from the I/O pin connectors 82. Four lines of input data are provided via RS4. RS5 enables sensing of the 60 Hz sync information as was done in the display module of the secondary units. Read strobe RS6 is utilized to strobe data from input pin ⑮ to the data bus, and input pins ⑬ and ⑭ are connected to a data selector 154 (Model No. 14053) which is also connected to receive manual IN and manual OUT information from the interface module.

FIG. 10 is a schematic diagram of the interface module appropriate for the master unit 50 of FIG. 2. Information is transmitted between the master unit and secondary units via communication path 52 (see FIG. 1). A 24 V DC level communication line may be provided or, optionally, a 115 V AC level line and appropriate circuitry (not shown) may be used. The circuitry illustrated below provides a 24 volts DC level. The coded message signal is represented as a single line, but it is understood that in practice four lines are provided with four separate transistor circuits to provide the coded message to the secondary units along the pins ⑤-⑧ of I/O pin connectors 80 of the interface module for the master unit 50. The transistors shown are utilized to convert the 24 volt sink lines to 24 volt source lines for driving the data over the communication path 52 to the interface modules of the secondary units. All output data on the right hand side of FIG. 10 is fed along the communication path 52 to all secondary units simultaneously. Flash calls, pre-empt calls and free op calls shown on the left hand side of FIG. 10 may be provided as optional input calls along I/O pin connectors 80.

The manual switches located on the face of the interface module of the master unit 50 are represented by switches S1–S4 in FIG. 10. The manual enable switch S4 may be closed together with switch S1 to provide IN and OUT directional signals to the master CPU. The manual enable switch S4 activated in conjunction with switch S2 selects the Split 2 condition whereas activation of manual enable switch S4 in conjunction with switch S3 selects "free-op" operation via a line fed directly to output pin ④ on the I/O pin connector 80. For transient isolation optical isolators are provided between the flash, pre-empt and free-op interconnections from pins ⑪, ⑫ and ⑭ and their associated output conductors.

Figure 11:
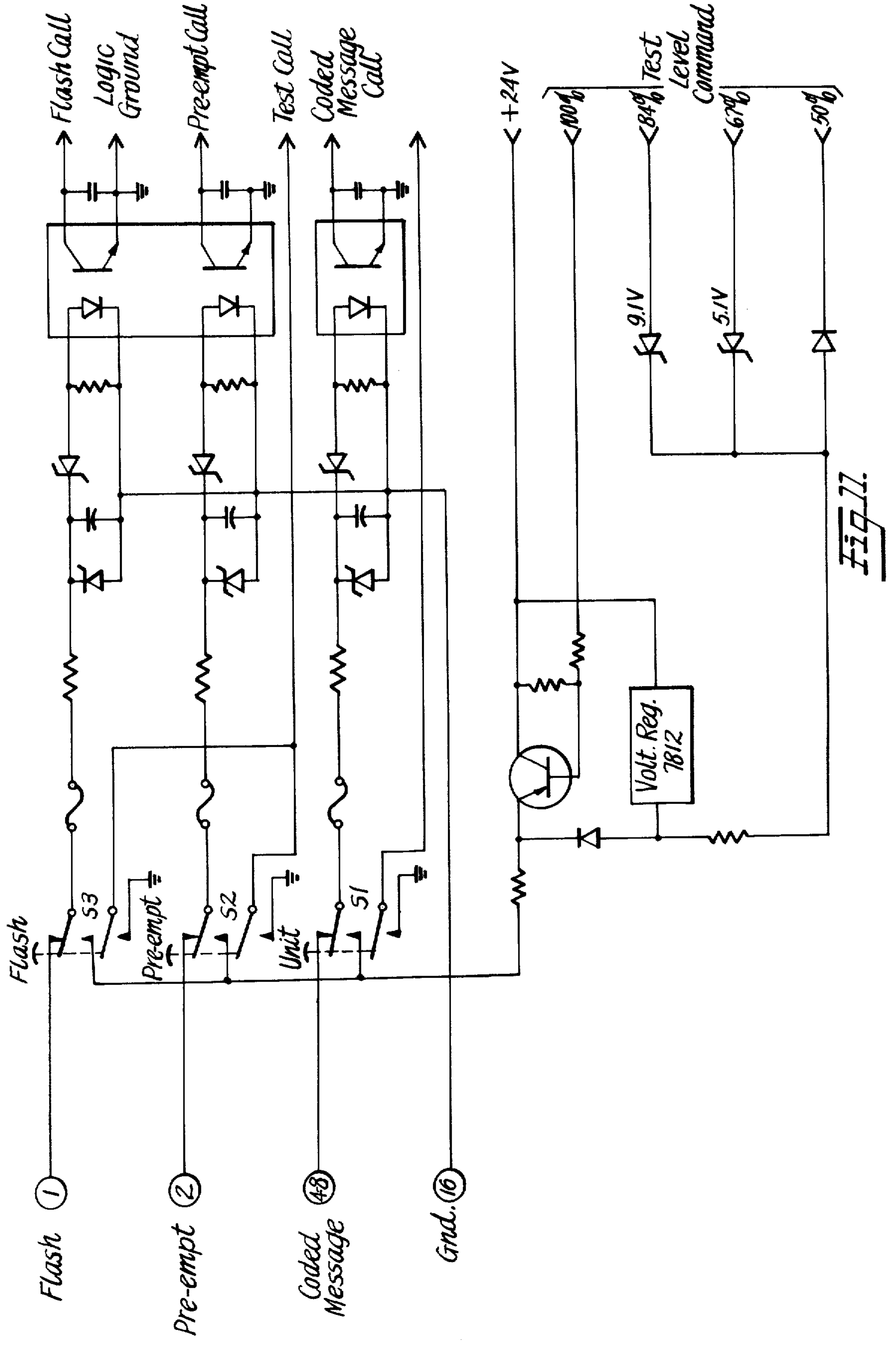
FIG. 11 is a schematic drawing of the circuitry within the interface module of a secondary unit.

FIG. 11 illustrates the 24 volts DC interface circuitry for the interface module of the secondary unit 40 shown in FIG. 3. The coded message and free op information are provided along pins ④-⑧ illustrated in the drawing as a single line for each of representation. Filter circuitry and optical isolators are utilized to convert the 24 volt signals from the master unit to logic level signals for feeding further circuitry in the secondary display module. Test level command information is generated in the secondary units for testing operation of the secondary interface module which may be subject to damage from transients and the like. The system's software steps the test level commands from the 100% to 84%, 64% and 50% levels sequentially to provide tests for the flash call, pre-empt call, free op call and coded message call.

Tables I and II show the pin assignments for the 24 pin I/O connectors 72 and 82 and 16 pin I/O connectors 70 and 80 respectively. The tables list the pin assignments for both the master and secondary units. The "phase green in" data listed in Table I for the secondary unit allows the master unit to monitor the green phase of the corresponding timer for two different timing rings each having as many as four green phases. Force-off outputs are provided for each ring on pins ⑨ and ⑬, and the MAX III, Call and call to artery green is provided on pins ⑩ and ⑫ respectively. The master pins ⑫-⑮ permit percent average calls to be made as selected by the operator by external means (not shown). Table II lists the pin assignments for the I/O pin connectors 70 and 80. Clock, data and sync information appear on pins ⑤-⑧. The data communication telemetry format is discussed in detail below.

TABLE I

| MASTER Function | Pin | SECONDARY Function | |
|---|---|---|---|
| Inbound Vol. Det. | 1 | Phase Green | 1 |
| Inbound Vol. Det. | 2 | | 2 |
| Outbound Vol. Det. | 3 | | 3 |
| Outbound Vol. Det. | 4 | | 4 |
| Inbound Ocp. Det. | 5 | | 5 |
| Inbound Ocp. Det. | 6 | | 6 |
| Outbound Ocp. Det. | 7 | | 7 |
| Outbound Ocp. Det. | 8 | | 8 |
| Indicator Inhibit Call | 9 | F.O. Ring 1 | |
| Spare Call | 10 | Max II | |
| Split 2 Call | 11 | Int. Adv. | |
| %Avg. Call, CL-1, No SC | 12 | Call Artery $\phi$ | |
| %Avg. Call, CL-2, SC-2 | 13 | F.O. Ring 2 | |
| %Avg. Call, CL-3, SC-3 | 14 | $\phi$ Omit | |
| %Avg. Call, CL-4, SC-4 | 15 | Indicator Inhibit | |
| Unit Fail | 16 | Call Non. Art. $\phi$s. | |
| Det. Fail | 17 | Sum. Checks | |
| 24V | 18 | 24V | |
| Inbound | 19 | P.E. Out (115V) | |
| Logic. Gnd. | 20 | Logic Gnd. | |
| Chassis Gnd. | 21 | Chassis Gnd. | |
| Occupancy | 22 | Flash Out (115V) | |
| 115V Neut. | 23 | 115V Neut. | |
| 115V AC | 24 | 115V AC | |

TABLE II

| MASTER | PIN | SECONDARY |
|---|---|---|
| Flash | 1 | Flash Call |
| P.E. | 2 | P.E. Call |
| Spare | 3 | Spare Call |
| Free Op. | 4 | Free Op. Call |
| CMA CLOCK | 5 | CMA Call |

TABLE II-continued

| MASTER | PIN | SECONDARY |
|---|---|---|
| CMB ($D_0$, $D_2$) | 6 | CMB Call |
| CMC ($D_1$, $D_3$) | 7 | CMC Call |
| CMS (SYNC) | 8 | CMS Call |
| Spare | 9 | Spare |
| 115V AC Input (AC only) | 10 | Spare |
| Flash Call | 11 | Spare |
| P.E. Call | 12 | Spare |
| Spare Key | 13 | Spare |
| Free Op. Call | 14 | Spare |
| 24V Input for Call | 15 | Spare |
| Ground | 16 | Ground |

FUNCTIONAL DESCRIPTION OF MASTER UNIT

OVERALL DESCRIPTION

The master unit 50 is designed to provide all of the system control functions for the coordinator system in accordance with the invention. The master unit basically samples traffic conditions, performs various traffic control decisions and communicates the results of these decisions to the plurality of secondary units 40. The prime function of the master unit is to calculate the most effective cycle length of the present sensed traffic pattern considering both the traffic detected by the volume detectors as well as by the occupancy detectors. The master unit may also be utilized to control the effective offset for each of the secondary units as well as to provide special "system" commands such as flash, free-op, pre-empt (P.E.), alternate split and percent average commands. The master unit also contains manual override switching means to effect manual operation of the system commands.

REAL TIME TRAFFIC SAMPLING

The master unit is responsible for sampling traffic conditions from both the volume and occupancy detectors. Volume detectors 18 and 20 provide a pulse signal upon actuation by a vehicle whereas the occupancy detectors, which serve to provide an internal traffic sampling, are of the pulse-duration type and thus stay in one state when a vehicle is present and in another state when a vehicle is not present. Indicators associated with the volume and occupancy detectors are energized to indicate vehicle activity. The master unit provides a failure indication by means of these indicators. These indicators are energized in a flashing mode whenever a fault condition is detected. The indicators for the volume detectors **18*a*, 18*b* and 20*a*, 20*b* are shown on the volume module of FIG. 2, and the indicators for occupancy detectors 22*a*, 22*b* and 24*a*, 24*b*** are shown on the occupancy module. The indicators associated with the detector flashes upon a failure condition as determined by the program in the master unit. The criteria established for indicating a failure condition for the volume detectors are a lack of any activity for sixteen minutes or a continuous actuation which exceeds two minutes. The criteria for a failure condition for the occupancy inputs are a lack of activity for sixteen minutes and a continuous activation which exceeds five minutes. Input signals which exceed the above criteria are ignored in the master unit.

MASTER CYCLE LENGTH COMPUTATION

The prime purpose of the master unit is to calculate the effective cycle length which is derived utilizing input information from both the volume and occupancy detectors. The coordinator system may operate in the INBOUND mode, OUTBOUND mode or AVERAGE mode. For each of these three conditions the master unit determines the most effective cycle length which is communicated to each of the secondary units. For example, if the system is operating in an INBOUND directional mode the larger of the two inbound volume detector signals is utilized in the volume computation, and the larger of the two inbound occupancy values are utilized in the occupancy computation. The specific manner in which the volume and occupancy values are utilized is set forth in detail below. The resultant cycle length is communicated to the secondary units. Two constraints are placed on the overall calculation. The first constraint is that the calculated cycle length cannot be less than the sum of the minimum arterial green time plus the maximum side street time. The second constraint is that the calculated cycle length cannot be more than the sum of the maximum arterial green time plus the maximum side street time. The minimum and maximum green times are presettable on thumb-wheel switches in the directional and system module of the master unit 50 respectively. The maximum side street time is also settable for two separate values corresponding to the Split 1 and Split 2 system configurations. These thumbwheel switches for the Split 1 and Split 2 configurations appear on the system module of the master unit 50. An associated indicator is energized to indicate which value is in effect.

VOLUME COMPUTATIONS

The volume computations are utilized in determining cycle length for both directional mode and average mode of operation. Basically, the volume computation depends upon the extent of sensor activity and the periods within the cycle that the sensor activity occurs. The system cycle may thus be defined as comprising two time periods or bands:

Total system cycle length $= S_R$ (red period) $+ S_G$ (green period).

The red period, $S_R$ is equal to the effective side street time which is the Split 1 or Split 2 side street times presettable on the system module of the master unit. This maximum side street time is equivalent to the red time for the artery. The green period, $S_G$, is calculated each cycle from activity detected during the red period, $S_R$, and the preceding last car passage (LCP) time, and continuing through the green period $S_G$ itself.

$S_G$ may be defined as comprising two time intervals, namely, $S_G = T_R + T_G$. $T_R$ is the time interval determined by activity occurring during the red period, $S_R$, and the preceding last car passage time. $T_G$ is the time interval determined by activity occurring during the green period before gapout is recognized. $S_G$ is, however, at all times constrained such that it may not exceed the front panel setting of the maximum green time as settable on the system module of the master unit 50.

The time intervals $T_R$ and $T_G$ are calculated as follows:

$$T_R = (E_R)(A_R)$$

OR the minimum artery green whichever is greater, where:

$E_R$ = the extension time per actuation time (front panel setting of the red headway on the volume module), which actuations occur during the period $S_R$ and the preceding last car passage time; and $A_R$ = the number of actuations detected while $E_R$ is in effect.

The calculation for the quantity $T_G$ is similarly given as:

$$T_G = (E_G)(A_G)$$

where:

$E_G$ = the extension time per actuation (front panel setting for green headway on volume module of the master unit), which actuations occur during the $S_G$ period less the last car passage time; and $A_G$ = the number of actuations detected during time $E_G$ is in effect.

The green period, $S_G$, is normally terminated by gapout, plus the time allowed for the last car passage, unless the quantity $T_R + T_G$, plus the last car passage time represents a longer green time than would be allowed by gapout termination. In this case, the longer period is used. In either case, $S_G$ is not allowed to exceed beyond the maximum green time.

Gapout termination is determined as follows: At the start of $S_G$, gap time equals the initial gap time (thumbwheel switch setting on inbound and outbound modules of the master unit 50) and retains the initial value until the gapout inhibit period is ended. At the end of the gapout inhibit period, the time to reduce period (thumbwheel switch settings on inbound and outbound modules) begins, and the gap time is reduced linearly over this period until the gap time equals the minimum gap setting (thumbwheel switches). If the minimum gap value is reached, it is retained for the remainder of the cycle.

Gapout recognition is inhibited and thus the appearance of a gap is ignored for an interval called the gapout inhibit period. This time period is simply the time $T_R$ minus the last car passage time (thumbwheel switches on inbound and outbound modules). When the gapout inhibit period is terminated, gapout timing begins. At the beginning of such gapout timing, the gapout time is equal to the initial gap setting, and the gap size is then linearly reduced. The gapout count continues unless a car is sensed by either of the volume detectors in which case the count is set to zero and begins again. When the gapout count equals the gap time, gapout occurs. When gapout occurs, the system operates to terminate $S_G$ after assuring sufficient time for the last detected car to clear, i.e. LCP time. An overall constraint, however, is that the total green time may not exceed the maximum green as set on the system module. Additionally, the gapout may not necessarily terminate $S_G$ if the accumulated volume or occupancy totals demand further extensions of the green time within the overall maximum green constraint. The basic reason for inhibiting the gapout count for a time period related to the value $T_R$ is to allow time for cars which have been backed up beyond the volume sensor during the red arterial phase, and therefore cannot immediately move as the light turns green, to pass across the volume sensor. If time were not provided an anomalous gap reading would appear shortly after the light turned green and the cycle could terminate too soon.

Figure 12:
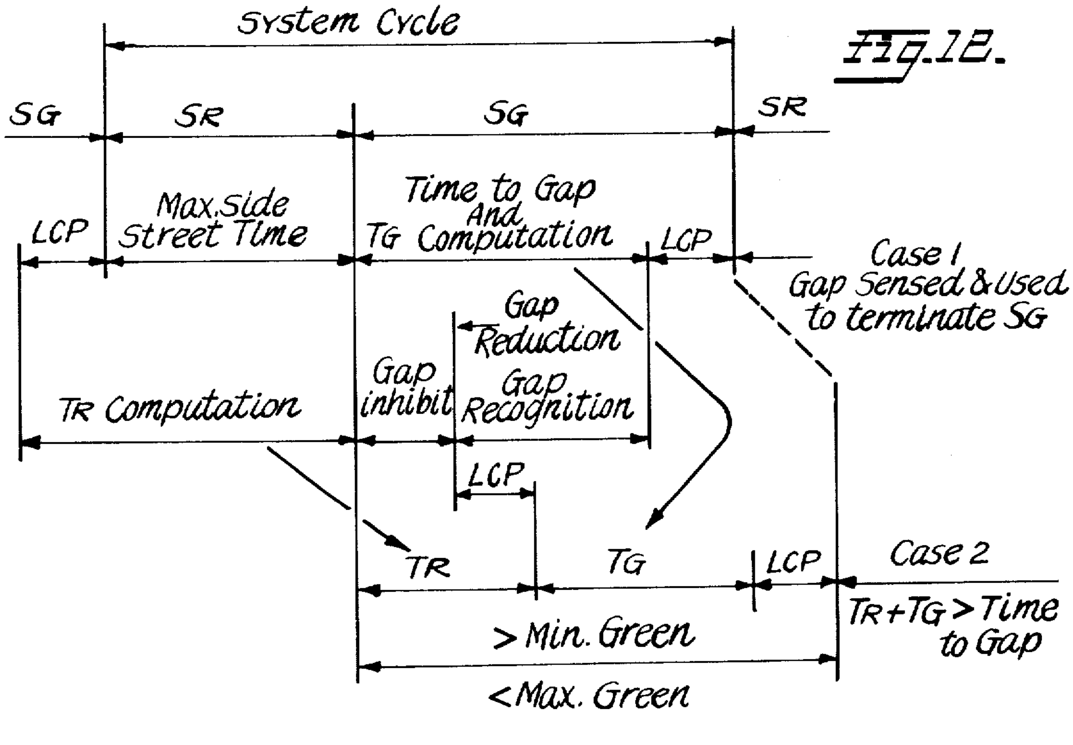
FIG. 12 shows a timing diagram depicting cycle length computation utilized by the master unit.

FIG. 12 illustrates a cycle length computation based on volume sensing utilizing the algorithm set forth above.

OCCUPANCY COMPUTATION

The occupancy values are based upon a running average obtained from thirty second increments averaged over a two minute period. The two minute averaging period may be varied over one minute increments to a maximum period of eight minutes via program memory modifications. Typically, a two minute window is set and the average is recomputed every thirty seconds for the most recent two minute window (most recent four readings). The occupancy values are derived from occupancy sensors which provide an input for the complete duration in which the vehicle is over the sensor position. Consequently, if during the thirty second sensing time a vehicle is stationary over the sensor a 100% occupancy will be registered for this particular thirty second time period. The 100% occupancy value will be averaged into the preceding three 30 second occupancy values to give a total two minute window which is updated every thirty seconds in a sliding fashion. The occupancy values are thus expressed in percentage of time in which the occupancy signal is present indicating the presence of a vehicle. It is necessary, however, to convert these percentage occupancy values into a cycle length counterpart value so that a comparison may be made with the cycle length as computed from the volume detectors described above. For the purpose of converting the occupancy percentage figure into a cycle length, thumbwheel switches labeled "$Y_{in}$", "X" and "You" are provided on the system module of the master unit 50. The conversion is derived from a straight line conversion of a portion of the occupancy values whose endpoints are defined by these preset values and whose endpoints match the two limits of the possible cycle length, namely, the minimum cycle defined by the minimum artery green time (direction module) and the maximum cycle defined by the maximum artery green time (system module). The minimum cycle match point is present on the thumbwheel switch labeled "X" and is settable throughout a range of 0–9 corresponding to a 0–90% of occupancy. This set point is effective for both directions and is termed the "X" set point. The maximum cycle match point is determined by the setting of the thumbwheel switch labeled either $Y_{in}$ or $Y_{out}$ depending upon the directional mode in effect. The thumbwheel switch positions range from 1 to 9 corresponding to a 10 to 90% occupancy and the zero value of the thumbwheel switch corresponds to the 100% occupancy value. Consequently, any occupancy value may be converted utilizing the linear conversion defined by the two endpoints into a cycle length value.

The actual directional cycle length selected for transmission to the various secondary units is simply the larger of the cycle lengths as calculated from volume considerations and from occupancy considerations separately.

AVERAGE CYCLE LENGTH SELECTION

The master unit also provides a means for selecting the average cycle length which is communicated when a non-directional (average) traffic mode is in effect. Four values of the average cycle length are presettable on the average module of the master unit 50 (FIG. 2). A maximum of 299 seconds may be selected for a cycle length. When the average mode of traffic flow is in effect, the larger of the inbound and outbound cycle lengths, whether derived from either a volume input or an occupancy input, is applied to the formula (IN+OUT)/2, and the result of this computation is compared to the four preset values available for the average system configuration. The preset value which most closely approximates the absolute value of the computation is the effective cycle length communicated to the secondary units when the average mode or system configuration is being utilized. The system cycle for the above is taken to be the outbound system cycle. An adjacent indicator indicates which cycle length is presently being communicated to the secondaries.

DIRECTIONAL COMMANDS

An additional function of the master unit is to determine when a directional command need be given so as to change the mode of operation of the coordinator system between the three modes, INBOUND, OUTBOUND and AVERAGE.

In order to accomplish the directional commands the master unit totals the number of volume vehicle actuations which are achieved within the present effective cycle length. The larger number of actuations selected from the two volume detectors at each end of the system (inbound volume detectors and outbound detectors) are applied to the following formula:

$$\frac{IN}{IN + OUT} \times 100$$

The derived value expressed in percent is compared to the two preset values (thumbwheel switches) which are expressed in percentages on the direction module of the master unit. Values derived exceeding the higher preset value cause an inbound directional command. Directional values lower than the lower preset value cause an outbound directional command. Derived values falling between or equal to the two preset values cause an average directional command. The program of the master unit is also provided with error detection subroutines such that if the inbound preset limit is lower than the outbound preset limit the associated IN/OUT indicators flash alternately and an average directional command is issued by the master unit until the fault condition is corrected. Proper operation is achieved for directional offset commands when the inbound percentage value is set higher than the outbound percentage value.

COMMANDS BASED UPON OCCUPANCY

The master unit issues "speed change" commands which act to change the effective offset at the secondary units depending upon the level of occupancy detected within the system. The offset changes are effectively speed modification commands which are based upon the occupancy level within the system as selected from the inbound and outbound modes of operation. The occupancy level expressed in percentage is determined using the running average obtained from thirty second increments averaged over a two minute window as explained above. These occupancy levels, expressed in percentage, are compared to four preset levels which correspond to the thumbwheel switch settings on the occupancy module of the master unit 50. Occupancy values exceeding the higher preset value (upper set of thumbwheel switches) cause a speed change #4 command to be issued. The speed change #4 command is a percent change in the offset and is settable using the upper set of thumbwheel switches of the Speed module of the master unit 50. Three additional speed change commands (labeled #3-#1 from top to bottom) are settable with thumbwheel switches on the Speed module. Occupancy values lower than the lowest preset value results in no speed change being issued. Occupancy values falling between these preset values cause preset speed change numbers #1-3 to be issued whenever the occupancy level exceeds the associated preset set point value. In the event that the preset value has been incorrectly set, i.e., not in increasing values, the four associated indicators flash and no speed change command is issued. A unit fault command is issued under these circumstances.

OUTPUT DECISION UPDATE INTERVALS

The master unit continuously provides updated information to the secondary units. The update intervals are controlled by the effective cycle lengths as derived from the system cycle. The transition from green to red ($S_G$ to $S_R$) is the synchronization point for update information. No output of the master unit changes more frequenty than or out of synchronization with the green to red synchronization point. There are, however, two exceptions as to the interval of update. These two exceptions are, however, still synchronous with the system cycle.

The first exception is the offset decision which effects a directional to average change. The directional to average update change is governed by a preset update interval of 0–9 minutes as determined by the "INTO" thumbwheel switch on the Direction module of the master unit 50. The value of zero on this thumbwheel switch implies the effective cycle length.

The second exception to the update interval is that pertaining to cycle length selection decisions in the average configuration. These are governed by a preset update interval of 0–9 minutes. The update interval is selected by a thumbwheel switch labeled "IN" in the directional module of the master unit 50. The value of zero implies the effective cycle length.

MANUAL OVERRIDE

The master unit contains a plurality of slide switches utilized for manual control. When the manual override is enabled, the thumbwheel selector switch on the face of the display module of the master unit is utilized as a cycle length selector allowing individual call to any of four average cycle lengths as follows.

| Select Position | Effective Cycle Length |
|---|---|
| | Average No. 1 |
| 2 | Average No. 2 |
| 3 | Average No. 3 |
| 4 | Average No. 4 |
| 5-9-0 | Average No. 1 |

The associated indicator is energized and the numeric display flashes to indicate manual override operations. The numeric display indicates the cycle length selected in seconds.

SYSTEM PERCENT AVERAGE

When called, by external control, the system percent average operation is effective at the next system cycle $S_G$ to $S_R$ transition. Lacking any other input call the accompanying cycle length is taken to be the #1 TWS average setting on the average module with no speed change. When the above call is enabled along with another call (see Table I) the accompanying effective cycle length is:

Average No. 2 with Speed change No. 2
Average No. 3 with Speed change No. 3
Average No. 4 with Speed change No. 4

DISPLAY

The display module of the master unit 50 utilizes two seven-segment displays for the least significant digit (LSI) and the intermediate significant digit (ISD). The most significant digit (MSD) is a combination of the plus or minus sign and a "1". For cycle lengths in excess of 199 seconds the "+" sign is activated indicating numbers of 200 to 299. For parameters expressed in percentage, the "−" sign is activated. A flashing display is utilized to denote manual override operation.

Ten selectable parameters from throughout the unit are available and appear on the display unit as governed by the selector switch on the display module as described heretofore.

FUNCTIONAL DESCRIPTION OF THE SECONDARY UNITS

Each secondary unit, such as the one shown in FIG. 3, contains a microprocessor and memory unit for enabling control of the specific intersection associated therewith. The secondary unit issues force off commands to the timer (controller 32) governing the intersection. The secondary unit receives the cycle length information transmitted to it by the master unit, and has memory space available for storing twenty-four individual cycle length messages. The cycle length is stored until the appropriate time for its use (depending upon the offset of the secondary unit). Thus, the master unit may effectively change the cycle length for each successive cycle when in a directional operation, and the respective cycle length associated with each platoon of cars passing through the system will be called into play by the appropriate secondary unit at the appropriate time. Thus, the cycle length associated with each platoon within the coordinated arterial system will be "rippled" through the artery in a successive fashion such that each platoon travels with its own cycle length.

The directional offset is settable using the thumbwheel switches on the offset module of the secondary unit 40. Offset relationships in each direction are determined in actual seconds of travel time from the start of the system utilizing a desired speed for vehicle traffic. Separate thumbwheel switches are provided on the offset module for both inbound and outbound directions. Thus, different speed limits may be set, if desired, for each direction.

Directional offset modifications may be made by the master unit. When such speed change offset modifications are commanded by the master unit the modified offset values utilized is the one dictated by the master unit.

AVERAGE OFFSETS

The secondary unit automatically calculates and implements average offsets which equally share the maximum possible green band between each direction for a given cycle length. The operation is based upon the offset setting used for the outbound direction, and thus the average speed is the same as that set into the outbound program. Alternately average offset may be set in percentage of cycle length as is more conventional in previous methods. A system calling command, communicated from the master unit, selects the preset percentage average offset operation.

In calculating the automatic average offset, each secondary unit compares its directional offset time with a reference cycle length which may be, for example, the presently effective cycle length. In effect, the reference cycle length is divided into the directional offset time to determine a remainder fraction, that is, the fraction by which the directional offset time falls within any multiple of a reference cycle length. Assuming the reference cycle length is 100 seconds and outbound offsets occur at 40, 80, 160 and 215 seconds for first through fourth intersections, the remainder fractions are simply 40/100, 80/100, 60/100, and 15/100 respectively. The average offset is taken to be either approximately zero or approximately fifty percent of the effective cycle length depending upon the value of the remainder fraction. A number of alternatives are possible. Using the example above, one may assign an average offset of zero (zero percent of reference cycle length) to all remainder fractions less than or equal to ½, and an average offset of 50 seconds (fifty percent of reference cycle length) for all remainder fractions greater than ½. Thus the first and forth intersections would have a zero average offset value, and the second and third intersection would have a 50 second average offset value. Alternately, the zero or fifty percent assignment may be made depending upon other criteria for the remainder fraction. One such alternative is to assign the zero percent value if the remainder fraction falls within a portion of the reference cycle length time defined by 0 to 24 or 75 to 100 percent thereof, and the fifty percent value if the remainder fraction falls within another portion of the reference cycle length time defined by 25 to 75 percent thereof. The software listings within the secondary utilize the above alternative in calculating the average-mode offset values for each of the secondary units in the system. The automatic average offset calculation is made within each secondary unit utilizing its particular outbound offset value as a reference input parameter.

TRANSITION RESPONSE

After a change in the offset value, the secondary unit resynchronizes itself with the new offset value by increasing or shortening the effective cycle length. For moderate offset changes, synchronization is accomplished within a single cycle. Larger offset changes are spaced over not more than three cycles of operation. Rapid synchronization is generally desirable, and the secondary unit will determine whether synchronization can best be reached by lengthening or shortening the cycle length. The effect of such lengthening or shortening to the traffic flow is also taken into account, and lengthening is generally favored when there is no choice preponderantly in favor of either mode. Before a shortening cycle length is attempted the secondary unit calculates the feasibility of such an approach by measuring early artery green return and the ratio of artery to side street service. The secondary unit may, for example, not be able to shorten a given cycle length since the side streets have a minimum green period which cannot be further reduced even in the presence of a force-off. Further, the side street will not react to a force-off during pedestrian crossing times.

FORCE OFF OPERATION

In the event that a controller and the associated secondary unit fall out of phase association, the secondary unit makes use of the force-off command to re-establish association. The secondary unit does not issue a force-off command before the associated controller has moved into phase association with the secondary unit. After association has been achieved the secondary unit issues a force-off command when it moves into the next phase unless the controller has also advanced to a new phase. The force-off command is held for approximately five seconds or until the controller advances, whichever event occurs first.

FREE OPERATION

The secondary unit causes the controller to be under coordination control at all times unless a free operation has been issued from the master unit. When in the free operation (free op) mode the secondary unit ceases to issue appropriate force-off commands to the controller and also drops the command for Max II extension limits and removes the constant arterial detector calls.

FLASH/PRE-EMPTION OPERATION

The secondary unit issues a 115 V, 60 Hz, command when directed by the master unit. This voltage is used to effect flash operation of the controller. Similarly, pre-empt operation may be effected upon command by the master unit in response, for example, to special intersection needs (fire station nearby, etc.).

TIMER MONITORING

Each controller has associated therewith a timing means which may comprise mechanical cams, electronic counters and the like. In the event that any given timer associated with an intersection controller fails to advance for one complete coordination cycle the secondary unit takes control of the interval advance circuit in the controller and steps it through each phase for the alloted split period as set on the secondary unit. (The interval advance (int. adv.) signal is connected to pin 11 as listed in Table 1.) Under these conditions the display portion of the display module of the secondary unit is utilized to indicate a failure of the timer by flashing the vertical stroke of the "+" symbol. If the timer fails to advance, even in response to the interval advance circuit, the secondary coordination unit issues a flash call.

STANDBY OPERATION

In the event of a loss in communication between the master unit and the secondary unit, the secondary unit continues to operate on the already communicated cycle length, offset and split information in the order of storage within the secondary unit. After the cycle length and other data associated with each platoon has been utilized, the secondary unit then continues to operate on the last fully communicated combination of cycle lengths, offset and split information.

Selectable standby cycle lengths are provided for use in the event of a loss of communcation from the master unit after a thirty minute time interval. The secondary unit reverts to normal operation under command of the master unit upon re-establishment of communication.

AUTOMATIC INPUT TEST

The secondary unit performs an automatic self test with regard to the interface module input circuits when called to do so by actuation of appropriate pushbutton switches on the face of the interface module. Separate tests may be provided for pre-empt, flash and coordination unit inputs. The self test calls appropriate functions into service for that time that the test is enabled by the operator. The test consists of applying input levels of 100%, 84%, 67% and 50% of the designed input levels on the inputs in sequence. In the case of the pre-empt or flash functions the resultant output may be observed and an evaluation may be made of the result and the "display" will indicate the percent level presently being applied. In the case of the coordination functions the response will be automatic and the results will appear in the adjacent display at the completion of the test. At that time the display will sequentially indicate the failed test level and the pin number of the inputs that have failed at this level. A non-fail test will display 00.

It is clear that although the secondary unit as desribed herein is a separate physical unit from its associated controller, it may equivalently be incorporated into the controller unit without effecting the system operation.

SOFTWARE DESCRIPTION

MASTER UNIT

The computer program of the master unit calculates the traffic signal cycle length and related parameters from three data sources. The first souce is the thumbwheel switches on the front panel of the master unit; the second source is the real time inputs representing cars entering and occupying the section of artery controlled by the master/secondary units. Thirdly, certain general override functions can be initiated by remote inputs. Since the program has final say, it can interpret any of these inputs, and does do so if they seem incorrect as compared to the parameters which are part of the program and constitute the final definition of what is a proper and correct front panel setting or sensor input.

While it is instructive to consider that the program is in a Red phase or Green phase, or in some particular subphase of one of these, the method employed to represent the assorted states which the system can get into employs a combination of explicit flags and different paths of program logic to uniquely represent the different possible situations.

The first few layers of information processing of the clock and of the real time inputs is done by regular polling. The sensor inputs (occupancy and volume for example) are sampled every 33 ms, and counters are incremented to indicate the number of pulses for volume inputs, percent of time which an occupancy input is found to be on, or merely the state of a clock counter. The system outputs are updated at regular (100 ms) intervals. At longer time intervals, 30 seconds, the sensor data is examined to check for the possibility of a fault.

The continuous processing of inputs and outputs so far described may be considered as background processing whereas the foreground processing constitutes the second by second update of system state as represented by Directional mode (Inbound/Average/Outbound) and Phase (Red/Green). The system flags include DIRSTAT (Directional mode), SYSTAT (red/green; sync; red/green ect.), GAPPROC (current directional cycle length has/has not been calculated), and GAPFLG (a gap over the threshold has been observed). In conjunction with these flags, a set of timers control the minimum waiting time before changing state. These include SPEEDTM which keeps track of the time between changes in speedwarp, INAVGTM which keeps track of the time spent in AVERAGE directional mode, INTOAVGTM which keeps track of the time spent waiting to enter Average mode, and AVCYCTM which keeps track of the time to be spent in a particular average cycle length before changing. These timers are setup and interrogated at times specific to the logic of phase changes, but they are decremented by the background timing logic every 30 seconds. Thus, these timers are an interface between the regular background and the context sensitive foreground.

To handle the foreground logic, the state of the flags controls the selection of a specific routine among several which is to be called each second. During green time either GRNUPDIR, or GRNUPAVG, or MANUAL is called once a second. During red time either REDTIME or MANUAL is called once a second. These four routines share certain basic duties. They all increment a counter, (ACTGN) which is the accumulating time in the current phase, and check this time against various limit values in order to change flags. The differences among these four routines lies in the logic whereby assorted variables are calculated and the flags are set and reset. Numerous subroutines perform calculations which are shared among the main routines, and several subroutines exist for logical clarity rather than the convenience of multiple applications of the same logic. For instance, during a directional nonmanual (automatic) green phase GSPEND and SYNCEND are called precisely once to perform unique operations which would otherwise fall into the purvue of GRNUPDIR. Information output portakes of both clock regularity and variations with phase.

The telemetry is composed as a sequence of messages whose content changes with the current state of system variables when the message is generated. The messages are typically 4.8 seconds long, and thus, are somewhat dated by the time they are completely sent. To partially combat this, the state of sync is appended to every nibble of information sent. The sync delay is at most 300 ms. The front panel display is updated every 100 ms.

Thus the presence or absence of pulses on the inputs is quantized into 100 ms slots for visual presentation. Similarly, the presence or absence of a gap between cars is quantized into one second slots.

Basic timing information is developed from an input which is 60 Hz divided successively by (2), (3), (2) giving 4 inputs the slowest of which is 5 Hz. The program loops examine this input until a change is observed. It then updates the software clock and executes assorted routines depending on the current time slot. These routines finish and control returns to the waiting loop until the next clock transition.

The significant time slots, or intervals between major routine executions are 33 ms, 100 ms, 1 s and 30 s. The first of these is used primarily to sample the volume and occupancy inputs. 100 ms is used mostly to update display outputs, and to initiate lengthy routines which are allocated an N.1 slot. (N indicates that the routine is executed each second but on the 0.1 second mark - not exactly on the second.) The 30 second slot is used to maintain long term counters and to check up on validity of inputs. The major routines which determine system state run on the one second mark.

The system state is either Red phase or Green phase. The Directional mode of the system is either one of manual inbound, manual average, manual outbound, inbound, average, outbound or percentage average. The Green phase can be broken down into sections. In particular, a sync pulse is transmitted by the master unit and persists for all but the last 2 seconds of the Green phase in order to inform the secondaries of an impending phase change. During the first portion of the Green phase, the green headway is used with the volume sensors as part of the cycle length determination. During the last car passage time, or following a gapout in a non-manual directional mode, the red headway is used. In a non-manual directional mode, Green phase time is further subdivided into a gap inhibit period followed by a gap waiting period followed by a possible extension period after a gap has been acknowledged but before the last car passage period. Unlike the previously mentioned phases which are fixed by thumbwheel switch (TWS) settings, the second and third subphases of a non-manual Green phase can be skipped depending on traffic.

At one second intervals, the time keeping driver executes one of the major phase routines (which depend on system state). These routines share the responsibility of (1) incrementing a counter, ACTGN, reflecting time accumulated in the current phase, (2) advancing system state when this counter exceeds the previously established limit, and (3) performing calculations towards determining the current cycle length and/or future cycle durations.

The major states of the system are represented by different program routines, but the large quantity of continuous repetitive work is handled by frequently executed but short and simple background routines. This ranges from nearly continuously called routines such as RTCLK which monitors the real time clock waiting for the next transition to routines operative once every several traffic cycles such as AVCYC which calculates the average cycle length during average cycles, but only repeats after a timeout period measured in minutes.

The master unit calculates a system cycle length and parameters for Directional mode and speed change from volume and occupancy real-time input, and transmits this information to each of the secondary units. Basically, cycle length increases with increased traffic, and direction is governed by the relative balance of inbound and outbound traffic. Speed change is proportional to traffic as measured by occupancy.

Directional mode is selected by comparing panel settings (TWS) with the calculated value of inbound volume/(inbound volume+outbound volume) in percent as follows:

| Criteria | Directional Mode |
|---|---|
| $OUT\% \leq \frac{IN}{IN + OUT} \leq IN\%$ | AVERAGE |
| $OUT\% < IN\% < \frac{IN}{IN + OUT}$ | INBOUND |
| $\frac{IN}{IN + OUT} < OUT\% < IN\%$ | OUTBOUND |

To avoid undue variation, changes of Directional mode are constrained so that $IN \rightleftarrows AVG \rightleftarrows OUT$ and $IN \not\rightleftarrows OUT$. Furthermore, two time delays are enforced. "IN" is the minimum amount of time which the system can stay in any cycle length in AVERAGE mode. "INTO" is the minimum amount of time it will remain in a Directional mode even though it may wish, by calculation above, to go into AVERAGE. To execute a transition, the calculation must be consistent throughout the waiting period. Thus frequent variations due to random traffic is discouraged, but truly necessary transitions are delayed by no more than the waiting times. Both the IN and INTO time periods are settable on TWS located in the direction module of the master unit 50.

Assorted error checking and comparison results in the selection of a maximum valid inbound and outbound volume and occupancy values. These values enter into the cycle length calculation along with the panel settings and are defined as follows:

$$VOL_S = E_R A_R + E_G A_G$$

A - Actuations
E - Extensions
R - Red
G - Green $$OCC = \frac{OCC\ \% - X}{Y - X}\left[\frac{Max}{Grn} - \frac{Min}{Grn}\right] + MinGrn$$

$$IN_S = MAX\ (VOL_{SI},\ OCC_{SI})$$

S - Seconds
I - Inbound
O - Outbound $$OUT_S = MAX\ (VOL_{SO},\ OCC_{SO})$$

$$\text{Calculated Average Cycle}\ \frac{IN_S + OUT_S}{2} + \text{Side Street Time} \quad (1)$$

The calculated Average cycle length value is used to select the closest panel setting in the average module of the master unit for transmission to the secondaries. From the selected average cycle length, the Green Time is simply the average cycle length minus the side street time.

In a Directional Mode, the cycle length is calculated from the current data. At the beginning of the Green phase the value Max Grn (green) is used as a provisional Green Time. After the gap inhibit time, $MAX(E_R A_R, MINGRN) - LCP$, the gap value is considered. When the time between any two successive actuations, considering actuations in either or both lines in this direction exceeds a gap value, or the time in Green extends to MAX Green - LCP, further calculations are performed. $A'_G$ (up to this point in Green) is used so as to find $MAX\{E_G A'_G + E_R A_R$, MIN Green, OCC [IN or OUT]$\}$. This value is used for the Green time unless it exceeds MAX Green in which case the latter is substituted. We now have a value for green time. Note that this value equals or exceeds the currently elapsed green time+LCP. In the latter case the system waits out the remaining time before going into LCP time. Cars counted after $A_G$ are included in the $A_R$ of the next cycle.

A discussion of the major operating subroutines together with flow charts and appendices giving detailed program listings may be found in copending application, Ser. No. 843,729 mentioned above, the whole of which application is hereby expressly incorporated herein by reference.

What is claimed is:

1. Apparatus for controlling a plurality of traffic signal lights at a plurality of intersections along a roadway, said apparatus operable in an average mode of operation to substantially equally favor traffic flow in each of two directions along said roadway, said apparatus comprising:

(a) data processing means including a central processing unit, data memory storage means and program memory storage means, (b) input means operably connected to and cooperating with said data processing means for generating signals corresponding to directional offset times for each of said intersections, said directional offset times proportional to the distance of said intersection from a reference intersection, (c) said data processing means operable, under program control, (i) for dividing a reference cycle length time into each of said directional offset times for determining a remainder fraction of said division for each of said intersections, and (ii) for selecting average-mode offset times for said intersections from one of the group of zero percent and fifty percent of said reference cycle length times in accordance with the values of said remainder fractions, and (d) interface means cooperating with said data processing means for controlling said traffic signal lights by utilizing said selected average-mode offset times as offset values with respect to said reference intersection in said average mode of operation.

2. Apparatus as recited in claim 1 wherein said data processing means is operable for selecting zero percent of said reference cycle length time if the value of said remainder fraction is within one portion of said reference cycle length time and for selecting 50 percent of said reference cycle length time if the value of said remainder fraction is within another portion of said reference cycle length time.

3. Apparatus as recited in claim 2 wherein said one portion and another portion are equal.

4. Apparatus as recited in claim 3 wherein said equal portions are each substantially one-half the value of said cycle length time.

5. Apparatus as recited in claim 2 wherein said one portion is approximately zero to 50 percent of said reference cycle length time and said another portion is approximately 50 to 100 percent of said reference cycle length time.

6. Apparatus as recited in claim 2 wherein said one portion is approximately zero to 25 percent or 75 percent to 100 percent of said cycle length time and said another portion is approximately 25 percent to 75 percent of said reference cycle length time.

7. A method of controlling a plurality of traffic signal lights at a plurality of intersections along a roadway in an average mode of operation to substantially equally favor traffic flow in each of two directions along said roadway comprising the steps of:

(a) generating a signal corresponding to a directional offset time for each intersection, said directional offset time proportional to the distance of said intersection from a reference intersection, (b) establishing a reference cycle length time, (c) automatically dividing said reference cycle length time into each of said directional offset times to determine a remainder fraction of said division, (d) generating a signal corresponding to an average-mode offset time for said intersections from one of the group of zero percent and 50 percent of said reference cycle length time in accordance with the value of said remainder fraction, and (e) automatically controlling said traffic signal lights by utilizing said generated signals corresponding to said average-mode offset times as offset values with respect to said reference intersection in said average mode of operation.

8. A method as recited in claim 7 wherein said step of generating a signal corresponding to said average-mode offset times comprise generating a signal corresponding to zero percent of said reference cycle length time if the value of said remainder fraction is within one portion of said reference cycle length time, and 50 percent of said reference cycle length time if the value of said remainder fraction is within another portion of said cycle length time.

9. A method as recited in claim 8 wherein said one portion and another portion are equal.

10. A method as recited in claim 9 wherein said equal portions are each substantially one-half the value of said cycle length time.

11. A method as recited in claim 8 wherein said one portion is approximately zero to 50 percent of said reference cycle length time and said another portion is approximately 50 to 100 percent of said reference cycle length time.

12. A method as recited in claim 8 wherein said one portion is approximately zero to 25 percent or 75 percent to 100 percent of said reference cycle length time and said another portion is approximately 25 percent to 75 percent of said reference cycle length time.

* * * * *